United States Patent
Yogerst et al.

(10) Patent No.: US 12,393,785 B2
(45) Date of Patent: Aug. 19, 2025

(54) SYSTEMS AND METHODS FOR LABEL GENERATION FOR REAL-TIME PROCESSED AND BATCH-PROCESSED STREAMS FOR MACHINE LEARNING TRAINING

(71) Applicant: Capital One Services, LLC, McLean, VA (US)

(72) Inventors: Shannon Yogerst, New York, NY (US); Tania Cruz Morales, Washington, DC (US); Haytham Yaghi, Oakton, VA (US)

(73) Assignee: Capital One Services, LLC, McLean, VA (US)

( * ) Notice: Subject to any disclaimer, the term of this patent is extended or adjusted under 35 U.S.C. 154(b) by 183 days.

(21) Appl. No.: 18/066,316

(22) Filed: Dec. 15, 2022

(65) Prior Publication Data

US 2024/0202457 A1 Jun. 20, 2024

(51) Int. Cl.
| | |
|---|---|
| *G06F 40/35* | (2020.01) |
| *G06F 40/117* | (2020.01) |
| *G06N 3/09* | (2023.01) |
| *H04L 51/02* | (2022.01) |

(52) U.S. Cl.
CPC ............ *G06F 40/35* (2020.01); *G06F 40/117* (2020.01); *G06N 3/09* (2023.01); *H04L 51/02* (2013.01)

(58) Field of Classification Search
CPC ............................... G06F 40/35; G06F 40/117
See application file for complete search history.

(56) References Cited

U.S. PATENT DOCUMENTS

| | | | | |
|---|---|---|---|---|
| 4,922,520 | A  * | 5/1990 | Bernard ................. | G07C 13/00 379/92.03 |
| 8,458,193 | B1 * | 6/2013 | Procopio ............... | G06F 16/313 707/749 |
| 11,241,616 | B1 * | 2/2022 | Ichapurapu ............ | G06F 3/038 |
| 11,416,904 | B1 * | 8/2022 | He ......................... | G06N 20/00 |
| 2008/0161035 | A1 * | 7/2008 | Tomioka ............... | H04W 16/14 455/550.1 |
| 2016/0379159 | A1 * | 12/2016 | Yasunaga ............... | H04N 7/185 705/28 |
| 2019/0057081 | A1 * | 2/2019 | Choi ....................... | G06F 40/56 |
| 2019/0158517 | A1 | 5/2019 | Muddu et al. | |
| 2020/0251188 | A1 * | 8/2020 | Will ....................... | G16H 10/60 |

(Continued)

FOREIGN PATENT DOCUMENTS

CN 110597796 B 12/2019

OTHER PUBLICATIONS

International Search Report and Written Opinion issued in International Application No. PCT/US2023/084386.

*Primary Examiner* — Daniel C Washburn
*Assistant Examiner* — Paul J. Mueller
(74) *Attorney, Agent, or Firm* — Foley & Lardner LLP

(57) ABSTRACT

Systems and methods for labeling data for artificial neural network models when data is received as real-time data and batch-processed data are disclosed herein. The system may receive a first data stream. The system may generate a first vector representation of the first real-time processed data. The system may determine the first label for a first training datum. The system may determine whether all data used to generate a final label has been received. The system may assign a first label type to the first label.

20 Claims, 7 Drawing Sheets

(56) References Cited

U.S. PATENT DOCUMENTS

| | | |
|---|---|---|
| 2020/0401939 A1 | 12/2020 | Copper |
| 2021/0029249 A1* | 1/2021 | Erhart ................. H04M 3/5175 |
| 2021/0056428 A1 | 2/2021 | Palowitch |
| 2021/0342539 A1* | 11/2021 | Zhang ................... G06F 40/253 |
| 2022/0237368 A1* | 7/2022 | Tran ........................ G06N 20/00 |
| 2023/0029608 A1* | 2/2023 | Chafni ................... G06N 20/00 |
| 2023/0386448 A1* | 11/2023 | Yao ......................... G10L 15/22 |

* cited by examiner

100

| | Dataset Identifier | Dataset Label | Modification Timestamp | Modifier Identifier | Model Error Indicator | Datum Identifier | Datum Label Type |
|---|---|---|---|---|---|---|---|
| 112 | Dataset 1 | "Error Type" | 08/23/19 | J. Singh | 0.90 | 123.txt | Draft |
| | | | | | | 124.txt | Draft |
| | | | | | | 135.txt | Draft |
| | | | | | | 315.txt | Draft |
| 114 | Dataset 2 | "Fix Type" | 08/12/23 | V. Shekhar | 0.55 | 315.txt | Draft |
| | | | | | | 234.txt | Final |
| 116 | Dataset 1 | "Issue Type" | 08/23/23 | S. Sargam | 0.13 | 123.txt | Draft |
| | | | | | | 124.txt | Final |
| | | | | | | 135.txt | Draft |
| 118 | Dataset 1 | "Error Type" | 08/28/23 | S. Sargam | 0.01 | 124.txt | Final |
| | | | | | | 135.txt | Final |
| | | | | | | 315.txt | Final |

Column labels: 120, 122, 124, 126, 128, 130, 132

FIG. 1

SYSTEMS AND METHODS FOR LABEL GENERATION FOR REAL-TIME PROCESSED AND BATCH-PROCESSED STREAMS FOR MACHINE LEARNING TRAINING

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be difficult, time-consuming and a manual task. Second, despite the mainstream popularity of artificial intelligence, practical implementations of artificial intelligence may require specialized knowledge to design, program, and integrate artificial intelligence-based solutions, which can limit the amount of people and resources available to create these practical implementations. Finally, results based on artificial intelligence can be difficult to review as the process by which the results are made may be unknown or obscured. This obscurity can create hurdles for identifying errors in the results, as well as improving the models providing the results. These technical problems may present an inherent problem with attempting to use an artificial intelligence-based solution in determining how to provide historical and contextual data regarding past labeling decisions with respect to datasets for machine learning inputs, to prevent inaccuracies in subsequent labeling of the same dataset. When data is labeled by multiple users, any inconsistencies due to, for example, labeling the same datum under different labels, may slow down task completion and cause machine learning modeling errors. Additionally, any unlabeled training data may require manual assignment and confirmation of a label, leading to inefficient input data processing. Data may arrive at different times, or dynamically, further complicating the accuracy and finality of labeling decisions.

SUMMARY

Methods and systems are described herein for novel uses and/or improvements to artificial intelligence applications. As one example, methods and systems are described herein for providing historical and contextual data that enables labelers of machine learning input data to aid in labeling decisions, including model evaluation data and label modification data. The system disclosed herein may aid in resolving labeling inconsistencies between multiple-user labeling tasks, as well as aid in labeling previously unlabeled textual data for further machine learning model processing. The system may distinguish between data that have not been finalized yet (e.g., real-time data streams) and data that has been completely received (e.g., batch-processed data) and store this information with labeling records, in order to ensure that any inputs applied to a machine learning model are afforded sufficient context for model evaluation and processing.

Existing systems require independent determination of labels for each received dataset, without the aid of historical information for similar past labeling decisions. For example, existing systems may require users of machine learning models to check incoming data before determining to which dataset or label to associate this data. These tasks may be time-consuming and may produce human error, due to subjectivity or mistakes. For example, the same chatbot text datum regarding a user complaint about a broken feature may be labeled as "error" or as "issue" by different labelers, leading to decreased model performance and consistency as datasets may be split or self-inconsistent. However, the difficulty in adapting artificial intelligence models for this practical benefit faces several technical challenges such as a lack of label metadata of past labeling decisions for datasets. For example, labelers currently may lack information on how labeling affects model performance, how and by whom a dataset may have been labeled previously, and whether data within a dataset has been completely processed or received prior to labeling.

To overcome these technical deficiencies in adapting artificial intelligence models for this practical benefit, methods and systems disclosed herein record and compile prior labels for datasets that are to be used for machine learning models, including information about a dataset's model performance with respect to its label, model run timestamps, identifiers or labeling entities, and labeling timestamps. The system may record this information as a record within a label record database. For example, the system may achieve this by receiving a label modification request and determining a model error indicator as well as a dataset identifier in response. Subsequently, the system may generate a record with this labeling information within a label record database, where other records related to dataset labeling may be stored. Accordingly, the methods and systems provide contextual information to labelers regarding both how a dataset may have been labeled previously, as well as model performance, which enables more accurate and more efficient decisions for further labeling tasks of the same or similar datasets.

In some aspects, the system may receive, at a device on a computer network, a label modification request for a dataset. The system may, in response to the label modification request, determine a dataset identifier and a model error indicator. Based on receiving the label modification request for the dataset, the system may determine a modification timestamp. The system may generate a label record, wherein the label record comprises the dataset identifier, the model error indicator and the modification timestamp. The system may generate the label record in a label record database, wherein the label record database comprises a plurality of label records.

Additionally or alternatively, methods and systems are described herein for resolving inconsistencies in labels associated with given data, which decreases the probability of model failure and reduces the need to review labels after initial labeling. In conventional systems where there may be multi-user labeling tasks, the same data or type of data may be labeled with different labels, such that inputs into a machine learning model may be incomplete or mislabeled. For example, such errors may be difficult to find, as labels may have subjective names or descriptions. Additionally, identifying and correcting such mistakes may be time-consuming and labor-intensive, requiring subjective analysis of each labeled dataset. The difficulty in resolving inconsistent labels for the same dataset may be compounded if historic information about the labels applied to a dataset is not available, as labelers may not see how a dataset may have been considered by different users previously. Adapting artificial intelligence models to solve this problem faces several technical challenges, such as a lack of historic labeling information, as well as contextual information about a dataset itself, such as the type of data stored therein. Additionally, even with contextual information regarding a dataset, determining how to base a decision to resolve a dataset that has been assigned multiple labels by different users is difficult.

The systems disclosed herein use contextual information regarding labels for data and natural language processing, in order to resolve inconsistencies where a dataset has been labeled by different labels. The system may leverage information stored within a label record database, including model performance, timestamp information, and dataset identification information, in order to generate similarity metrics between a given datum and data within other datasets. For example, by considering these similarity metrics, such as through comparison with other similarity metrics corresponding to other datasets, the system may determine which dataset is most similar to a given datum and may determine which label to apply to the datum based on this determination. Thus, the system may provide the benefit of matching a datum with the label that places it in the most similar dataset, enabling the system to ensure that any inconsistencies with data are resolved, leading to improved model performance and consistency.

In some aspects, the system may receive, at a device on a computer network, a label modification request for a training datum for a machine learning model, wherein the label modification request comprises a new label and a datum identifier. The system may retrieve, from a label record database, a plurality of label records corresponding to the datum identifier. The system may compare a pre-existing label from the plurality of label records with the new label. Based on determining that the pre-existing label from the plurality of label records differs from the new label, the system may generate, based on the label record database, a first dataset labeled with the new label, and a second dataset labeled with the pre-existing label. The system may calculate a first average similarity metric between the training datum and the first dataset, and a second average similarity metric between the training datum and the second dataset. The system may compare the first average similarity metric with the second average similarity metric. Based on comparing the first average similarity metric with the second average similarity metric, the system may generate a recommendation for a modified label.

Additionally or alternatively, methods and systems are described herein for the automatic generation of a label for unlabeled text data. For example, the system may compare the unlabeled datum with previously-labeled data in a database to recommend a label for the datum. Existing systems require manual labeling of input data, by considering the source of data, type of data, and motive for analysis. However, this process takes considerable time and may be inefficient, as multiple labelers may be needed, which may lead to inconsistencies in labeling as well. For example, existing systems rely on subjective experience and bias regarding labeling decisions, as labelers may not be aware of all previous labeling decisions and the associated datasets. However, adapting artificial intelligence models for this practical benefit faces several technical challenges, such as a lack of a centralized storehouse of information regarding labeling decisions, as well as model performance information after labeling. For example, an automatic labeling system may not have access to the datasets that have already been labeled, in addition to what data is already within these datasets, and when or by whom they were modified.

The system described herein leverages similarity metrics between previously-labeled data and the unlabeled datum under consideration in order to determine a previous label record associated with data similar to the unlabeled datum. Thus, the system may generate a recommendation for a label for the unlabeled data based on previous labeling decisions, as well as any contextual information related to the relevant labels or datasets. For example, the system may use model performance information, similarity metric information from natural language processing, or sentiment analysis in order to classify textual chatbot data into relevant labels for further processing in a machine learning model (e.g., to produce analysis of a user's satisfaction with an application's features). By leveraging this additional, historical labeling information, the system may provide the benefit of objective, efficient labeling of unlabeled data, while mitigating the chance of model failure or incompleteness of input datasets. Thus, the performance of modeling and data evaluation may be improved through this improvement in the consistency of labeling new data.

In some aspects, the system may receive, at a device on a computer network, first text data for a first unlabeled training datum in a first training dataset for a machine learning model. The system may retrieve a plurality of textual datasets corresponding to a plurality of label records from a label record database. The system may determine a first dataset that corresponds to a first label record within the plurality of label records. The system may determine a first plurality of textual data corresponding to the first dataset. The system may compare the first text data and the first plurality of textual data to determine a first plurality of similarity metrics between the first text data and respective textual data in the first plurality of textual data. Based on the first plurality of similarity metrics, the system may determine the first label record for the first dataset. The system may generate a first recommendation for a first label for the first text data based on the first label record.

Additionally or alternatively, methods and systems are described herein for distinguishing between and recording labels that may be based on real-time data or batch that may be incomplete. For example, the system may receive real-time chatbot information and determine whether the data stream has completed or not; based on this determination, the system may apply a label to the information with a label type marker that indicates whether the data has been completely received. Existing systems may only label a datum or a dataset upon receipt or processing of the entire dataset. Labeling may not be possible until all data arrives, as it is too time-consuming to label and re-label data within a short period of time (e.g., during transmission or receipt of data). Thus, conventionally, data may not be able to be processed through a machine learning model until after complete receipt, leading to delays and inefficiencies. Additionally, even in cases where labels are applied to incomplete data, this data may not be marked as such, and, thus, it may be difficult to tell whether the quality of data is affected due to this incompleteness. That is, it is difficult to keep track of which data may be ready for processing through a machine learning model. Adapting artificial intelligence to solve this problem faces several technical challenges, such as making a determination as to whether data has been completely received, generating a label, allowing the label to be modified upon data completion, and how to store label assignments.

The system may leverage vectorization of text data and natural language processing to generate labels in real time for data that may be real-time or batch-processed. For example, the system may use sentiment analysis or vectorized chatbot data in order to determine whether the interaction is about user experience. In response, the system may label this real-time data as "user experience" data, and apply a "draft" type label upon a determination that the interaction has not finished. Accordingly, the method and systems may take into consideration the completion status of data in further processing through the relevant machine learning model. Thus, any results due to this preliminary data may be marked as such, while still allowing real-time analysis of data—this benefit enables labelers and analysts to more efficiently process and evaluate data and model output, while improving real-time processing capabilities when compared to conventional static labeling.

In some aspects, the system may receive at a device in a computer network, a first data stream, wherein the first data stream comprises first real-time processed data for populating a first label for a first training datum in a first training dataset for a machine learning model. The system may generate a first vector representation of the first real-time processed data for use in a natural language processing model. Based on processing the first vector representation through the natural language processing model, the system may determine the first label for the first training datum. The system may determine whether all data used to generate a final label for the first training datum has been received. In response to determining that not all data used to generate the final label for the first training datum has been received, the system may assign a first label type to the first label.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1 shows an illustrative diagram demonstrating a data structure including historical information for chatbot data labels for use in machine learning models, in accordance with one or more embodiments.

DETAILED DESCRIPTION OF THE DRAWINGS

Figure 2:
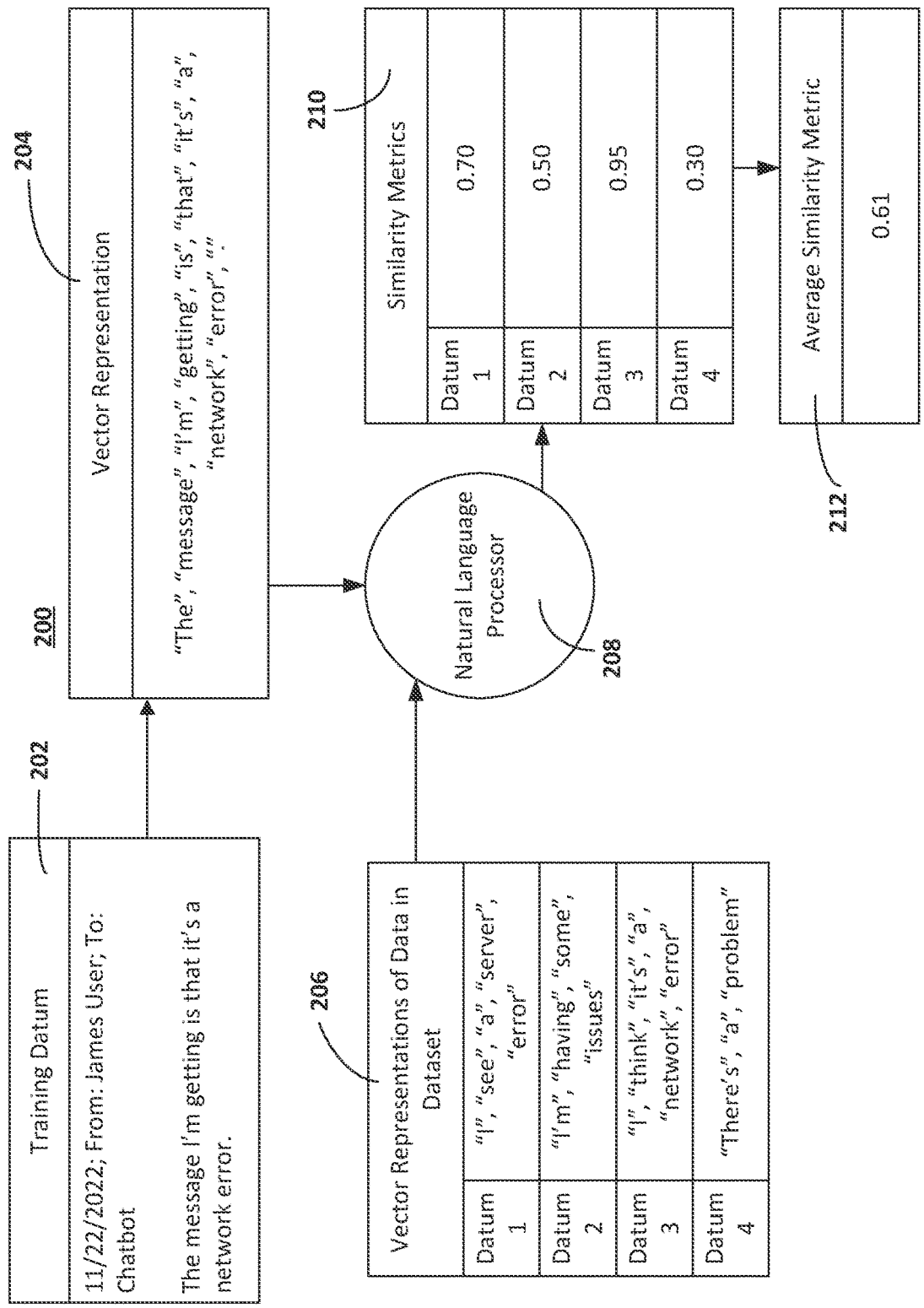
FIG. 2 shows an illustrative diagram for generating similarity metrics between a datum and a dataset through natural language processing for label determination, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1 shows an illustrative diagram demonstrating a data structure including historical information for chatbot data labels for use in machine learning models, in accordance with one or more embodiments. For example, data structure 100 may represent a label record database for storing records of labeling decisions for modifying dataset labels. The label record database may include label records 112-118, each of which may include information regarding labeling decisions for datasets. For example, each label record may include information regarding dataset identifiers 120, dataset labels 122, modification timestamps 124, modifier identifiers 126, model error indicators 128, datum identifiers 130 or datum label types 132.

For example, FIG. 1 illustrates data structures that may store information regarding labeling decisions for datasets for machine learning inputs. In response to a request to modify label information for a dataset, the system may store information regarding this dataset modification for future reference, such that labeling decisions may be made based on this information. In conventional systems, labels are permanently applied to datasets with no reference to a dataset's past labels or model performance. On the other hand, a label record database, such as that portrayed in data structure 100, may enable labelers to track past labeling decisions and, as such, may provide contextual information regarding the performance and success of past labeling decisions based on this information. Additionally or alternatively, a label record database may show other datasets that have been labeled similarly, or datasets that are quantitatively or qualitatively similar, in order to put forth further context for labeling a given dataset or datum. As such, the system may enable more efficient labeling decisions, as well as decisions that are internally consistent with other datasets within the system. Thus, the system may ensure improved efficiency and robustness in labeling machine learning input data, and may reduce the need for re-evaluating labeling decisions due to poor model performance.

For example, the system may be used to label datasets arising from virtual assistants, such as chatbots. In disclosed embodiments, a virtual assistant may include a software agent that may perform tasks or services for users based on commands or questions. In some embodiments, the virtual assistant may include a chatbot with a textual interface (e.g., through instant messaging). In some embodiments, a virtual assistant may include smart-speakers or mobile operating systems that receive queries through sound, such as through microphones, and may process this information using speech recognition technology. In some embodiments, a virtual assistant may include wearable technology with capabilities to perform tasks or service in response to commands, such as smart-watches or smart-rings, where commands or queries may be received and answered in a portable, wireless manner. As virtual assistant data may be diverse in format and length, and may be transmitted or received in various manners, it may be especially challenging to classify virtual assistant data into labels for further processing through machine learning models. Thus, a system that provides contextual labeling information and may compare datasets based on qualitative or quantitative similarity may ensure that virtual assistant data may be classified efficiently and accurately.

For example, the system may be used to label data arising from chatbots. In disclosed embodiments, a chatbot may include a software application used to conduct online chat conversation via text, rather than through contact with a live human agent. In some embodiments, chatbots may be designed to simulate the way a human may behave conversationally. For example, chatbots may be accessible through websites, through application programming interfaces or through applications. Chatbots may receive instructions or commands through a text input interface (e.g., through an interface with a physical or virtual keyboard), or may receive instructions or commands through speech and a speech recognition program. Chatbots may output information or answers to queries as text or through speech (e.g., through a text-to-speech system), As data received from chatbots (e.g., a chatbot's output text data) may be created dynamically through the course of a conversation with a user, labeling chatbot data may be difficult until a full set of data is received, which slows down processing. The system disclosed herein may document labels for text data even if it has been dynamically received and is not finalized yet. Thus, the system enables preliminary processing tasks even in the event that, for example, a chatbot conversation has not terminated. Additionally, any data that is still preliminary may be clearly marked, improving subsequent handling and decision-making of such data, which enables the system to further inform decisions regarding data input selection for training machine learning models.

The system may be used to label and categorize data arising from chatbot users. In disclosed embodiments, a chatbot user may include any user of a chatbot or an equivalent virtual assistant. For example, in some embodiments, a chatbot user may include a user of an application requesting support, such as technical support or account support. A chatbot user may include a user of an application requesting information, such as weather or traffic information for a given location. In some embodiments, a chatbot user may interface with the chatbot through a mobile device, such as a laptop computer, a smartphone or a tablet. In some embodiments, a chatbot user may interface with the chatbot through a desktop computer, keyboard, or a microphone, through speech-to-text recognition. The chatbot user may utilize words, phrases, sentences or numbers, and may provide information, ask questions, or issue commands to the chatbot. Chatbot users may communicate with the chatbot in unpredictable ways, starting and stopping interactions sporadically or responding to a query after a long time. As such, the system may determine label types corresponding to label decisions that encapsulate information regarding whether data has been fully received or not. In this manner, the system may make determinations as to the accuracy or completeness of machine learning output data arising from this chatbot input data depending on whether any data relating to the chatbot interactions is pending.

The system may receive a request to label chatbot data from speech recognition models. In disclosed embodiments, a speech recognition model may include methodologies or technologies that enable recognition and translation of spoken language into text. In some embodiments, speech recognition models may require training, where a user may read text or isolated vocabulary in order to train the system. The system may analyze the user's voice and fine-tune recognition capabilities based on the user's voice sample. In some embodiments, speech recognition may utilize hidden Markov models, dynamic time warping, neural networks, or end-to-end automatic speech recognition. In some embodiments, speech recognition may be used to convert a user's speech to a textual dataset that may be stored or input into an application or a machine learning model. For example, speech recognition may enable a user's request for weather information (e.g., a user's question. "What will the weather be like tomorrow?") to be translated to text, such that it may be stored and/or processed by a chatbot for further processing. A speech recognition model may enable the system to process more types of data, and may enable the system to determine textual data from speech data. The system disclosed herein may subsequently label this textual data depending on the context, nature, or words within the data. By enabling receipt of both speech and text information, speech recognition may enable more data to be processed and labeled by a chatbot, as well as beyond a chatbot for the purposes of training, evaluation, or data analysis.

FIG. 2 shows an illustrative diagram for generating similarity metrics between a datum and a dataset through natural language processing for label determination, in accordance with one or more embodiments. For example, the system may utilize flow 200 for the generation of similarity metrics of unlabeled textual data. The system may receive training datum 202, which may include textual data from a chatbot interaction, for example. The system may generate vector representation 204 of this training datum, for example, through using a bag-of-words method. The system may also retrieve and/or generate vector representations 206 of data in a dataset. The system may input vector representation 204 and vector representations 206 into natural language processor 208 in order to generate similarity metrics 210 between the training datum and each datum within the dataset. Thus, the system may generate average similarity metric 212 to determine a measure of similarity of a training datum with a previously compiled dataset. Conventional systems may execute labeling decisions with manual labelers, with little to no knowledge of previous datasets that may have already been labeled. Thus, conventional labeling tasks may produce errors, inconsistencies or duplicated labels for the same data, potentially leading to model input errors and unsatisfactory machine learning performance. By calculating similarity metrics between unlabeled data and other datasets, the system may objectively determine previously-labeled datasets that are most similar to the unlabeled data in a way that is consistent with previous labels and in a non-subjective manner. By doing so, the system may improve modeling outcomes and improve the efficiency of labeling tasks prior to further data processing.

The system may receive a label modification request. In disclosed embodiments, a label modification request may include a request to modify a label for a dataset or an individual datum. In some embodiments, a request for modifying a label may include any number of attributes, including dataset identifiers 120, dataset labels (e.g., a new or pre-existing label) 122, model error indicators 128, datum identifiers 130 or datum label types 132, as shown in FIG. 1. For example, a label modification request may include a request to relabel a particular datum from one label to another (e.g., a datum that is identified as "123.txt"). In some embodiments, a label modification request may, additionally or alternatively, seek to modify the label for an entire dataset, which may include multiple data within. A label modification request may include a filled form or other data structure. Additionally or alternatively, the label modification request may be generated in response to a user modifying a dataset or a dataset label, for example. In some embodiments, a label modification request may include a temporal identifier or another measure of a time of the request, or another time relating to the dataset or related processing. In some embodiments, the label modification request may arise from a modifier (e.g., a user of a computer device making the associated label modification). In some embodiments, the label modification request may include a measure of a dataset's performance in a computer model, such as a model error indicator. By receiving a label modification request, the system may collect information that may be useful in documenting changes to labels, which may ensure that the system may rely on this historical information to learn from previous labeling decisions. Unlike in conventional systems, where label modification may permanently change a dataset or datum's labeling, the system may document any changes in a single database to aid in further labeling decisions, leading to improved, quicker decision-making, without the need to specifically investigate a dataset's labeling history.

The system may use a model error indicator (e.g., model error indicators 128, as shown in FIG. 1). In disclosed embodiments, a model error indicator may include a measure of errors produced during or as a result of processing input data through a model. In some embodiments, a model error indicator may include a calculation of a statistical measure of error. For example, a machine learning model may calculate a forecast of maximum temperatures for a week based on input data that may include information regarding past weather conditions. In some embodiments, the system may calculate a model error indicator based on a calculation of the difference between the forecast and the actual maximum temperatures during the same time period (i.e., a calculation of residuals). For example, the system may calculate a chi-squared metric depicting the error in the forecast, a mean-squared error, or another statistical measure of error, based on the output data versus the input data. In some embodiments, the system may compare a model error indicator for a dataset associated with a label record with a threshold model error. The threshold model error may include a value determined by an administrator or by other means to which a comparison may be made. For example, if the model error indicator is found to be above a threshold model error, the system may generate a warning, such that labelers may note that a dataset may not have achieved pre-set standards. By doing so, the system may help mitigate poorly performing data labels by flagging these to administrators or other users.

In some embodiments, the system may determine the lowest model error indicator out of a plurality of model error indicators. For example, the system may make a linear search of an array of each dataset's model error indicator. The system may set a first guess for a minimum value for the model error indicator (e.g., using the first element of the array), and compare this minimum with every other element in the array. The system may update the minimum value upon finding an element with a lower model error indicator, thereby determining the lowest model error indicator. In some embodiments, the system may utilize a tournament method, wherein the array of model error indicators is separated into two, and maxima are compared between the two. In some embodiments, a pair-wise method for determining the lowest model error indicator may be used, wherein pairs of elements of the array of model error indicators are compared with a stored minimum value, and this stored value may be updated upon finding a lower model error. A dataset with a lower model error indicator may act as more effective training data for a machine learning model, such that the model's predictions are more accurate than for datasets that exhibit higher model error indicators. Thus, by determining a lowest model error indicator, the system may generate a recommendation for labeling data that trains the machine learning model to exhibit better model performance (i.e., lower error), thereby improving the accuracy of the associated machine learning predictions.

In disclosed embodiments, a statistical measure of error may include any quantitative measure of a deviation between a model's output and a true value. For example, a statistical measure of error may include a mean-squared error, a sum of squares of residuals, or a sum of absolute errors. The statistical measure of error may be normalized (e.g., divided or transformed) such that model outputs may be compared in relation to an idealized model performance, even for models that produce different types of output. By doing so, the system may include information regarding how a labeling decision may affect model output. For example, label record 112 may describe Dataset 1, which may include data identified as "123.txt," "124.txt." "135.txt." and "315.txt." Label record 112 may include a model error indicator of value 0.90, which may be out of a maximum value of 1. By modifying the labeling of data in a way that excludes datum 315.txt, label record 116 demonstrates that the model error indicator decreased from 0.90 to 0.13, demonstrating an improvement in model error. Thus, the system may determine that 315.txt should not be labeled under Dataset 1, thereby improving model performance and enabling future decisions for labeling similar datasets and training machine learning models based on this data.

In some embodiments, the system may determine the model error indicator by generating a quantitative measure of model error based on a qualitative outcome related to the model. For example, the system may assign a model error indicator of 1 (e.g., some maximum error value) if a model through which the dataset is input does not run at all due to a technical issue. In this sense, the model error indicator may provide information about whether the input may be compatible with a given model. By recording this information in the label record database, the system may leverage this qualitative information regarding the performance of a labeled dataset through a model and compare this performance quantitatively with other datasets, even for qualitative outcomes or performance measures. Thus, the system may, for example, avoid labeling data with a label of the wrong type, if it leads to inoperative modeling results, which improves the efficiency of troubleshooting and mitigates the risk of breaking computer models with incompatible data.

The system may use a user identifier. In disclosed embodiments, a user identifier may include any identifier of a modifier of a dataset or data labels. For example, a user identifier may include a name, username, or another numeric, alphabetical or alphanumeric identifier of a modifier of a dataset. In some embodiments, a user identifier may include a name or other identifier of a particular device, or an Internet Protocol (IP) address. In some embodiments, a user identifier may be determined by linking a device name or address with a user of the device. By including information about a user who requests label modification, the system tracks which entities may modify labels and what the modification is, before storing this information on a label record database. By recording this information, the system enables labelers to view and consider information regarding who may have labeled datasets, which may provide clues as to projects, patterns or motives relating to particular modifiers of labels. For example, a labeler who is working on chatbot data for financial analysis may label a dataset related to a client "account holder data," while a labeler working the same data for user satisfaction purposes may label the same dataset "user data." Thus, providing information regarding the modifier of a dataset may enable the system to store information to aid in disentangling any inconsistencies in labeling due to human error or subjectivity.

The system may receive or handle a training datum. In disclosed embodiments, a training datum may include any information to be used or processed as an input in a machine learning model. For example, a training datum may include a text string response to a question from a chatbot that may be processed to determine user satisfaction for a feature of the chatbot. A training datum may have any format, including text data (e.g., alphanumeric strings), audio data (e.g., a recording of a conversation), numerical data (e.g., service usage statistics). A training datum may include data structures such as tables, matrices, arrays or pointers, or may include individual pieces of information. A training datum may be used in the training of a machine learning model. For example, a training datum may be provided to a machine learning model such that it includes expected output in order to train any parameters of the machine learning model. In some embodiments, a training datum may be used as an input to the machine learning model itself, for further processing or predictions. In some embodiments, a training datum may already include an associated label. For example, a particular training datum may have been given multiple labels by various labelers or for different applications. As such, a training datum may be associated with multiple datasets corresponding to these respective label modifications. A training datum may be associated with a datum identifier. A datum identifier may include, for example, a filename storing the datum, a file location, or a combination of a file location and a version creation time (e.g., for files that have been modified). For example, FIG. 1 shows datum identifiers 130 in the form of file names corresponding to respective label records 112-118. In some embodiments, a datum may be included within a file that includes a dataset, and may be referred to by an identification number, such as a row number, column number, or another coordinate that enables locating or identifying the training datum. By enabling identification and reference to individual data, the system enables a label record database to reflect any changes to grouping of data within a dataset. For example, over the course of a labeling task, if a labeler excludes a particular datum from a dataset (e.g., because of a determination that the datum was incorrectly labeled as relating to user satisfaction), the system may enable labelers to view which data was moved out of the dataset, and what the composition of the updated dataset may be. By doing so, the system improves transparency in labeling decisions and enables users of the given datasets to understand modifications, to aid in any improvements or to troubleshoot model performance.

The system may use or handle datasets. In disclosed embodiments, a dataset may refer to a structure that includes multiple data, including training data or output data. For example, a dataset may refer to a set of data where all data in the set are related to a type of error experienced by a user. In some embodiments, a particular label (e.g., "Error Type" as shown in FIG. 1 for label record 112) may be associated with a given dataset (e.g., Dataset 1 in FIG. 1). In some embodiments, a dataset may be textual in nature (i.e., a textual dataset), where each datum within the dataset may include textual data. For example, a textual dataset labeled as "Error Type" may include textual data of alphanumeric strings that include sentences related to users complaining about errors and specifying the type of error. In one or more use cases, a dataset may include a collection of data in different formats but linked by common trait (e.g., a common origin, theme or storage location). In some embodiments, textual datasets may be generated from audio or speech data through speech recognition software. Datasets may be associated with inputs or outputs for machine learning models. Datasets may include a collection of training data, which may include labeled data for purposes of training a machine learning model with expected outputs. For example, a machine learning model may accept as input a dataset (e.g., a textual dataset), and may, in response to the input, generate an output dataset that includes a plurality of output data.

In some embodiments, datasets may be independent of machine learning models. For example, the system may utilize reference datasets. In disclosed embodiments, reference datasets may include data that may be compared against another dataset. For example, reference datasets may include real, ground-truth data to be compared against output data from models. For example, a reference dataset may include training output data or ground-truth data, such as data that has already been predicted through other means but is being used to evaluate or fine-tune a machine learning model. In some embodiments, a reference dataset may include real-world data, such as weather observations, which may be used to evaluate machine learning model predictions from output, such as a weather forecast. By comparing reference data within a reference dataset with output data within an output dataset, the system may enable evaluation of model performance and, for example, calculation of model error indicators. By doing so, the system may evaluate labeling decisions, such as which data to include within a given labeled dataset. Thus, the system may improve the accuracy of labeling decisions by including this model performance information within the label record database. In some embodiments, a reference dataset may include a dataset that may be compared with a relevant dataset for the purpose of finding similarity between datasets. For example, the system may determine similarity metrics between datasets in order to determine a recommendation for a label for a given unlabeled dataset. By doing so, the system may provide objective, unbiased suggestions for labeling decisions without human input, while providing recommendations consistent with previously-labeled data.

The system may utilize, generate, or handle feature inputs. In disclosed embodiments, a feature input may include any individual measurable property or characteristic of a phenomenon. For example, a feature input may include numeric data, such as statistical data, or may include structural features, such as strings or graphs. In some embodiments, a feature input may include a dataset that includes data prepared for processing through a machine learning model. For example, a feature input may include a plurality of text strings of sentences within chatbot interactions that are related to an error type. In some embodiments, a feature input may be vectorized within a vector space known as a feature space. A feature input may directly refer to specific datasets (such as those listed in data structure 100 under dataset identifiers 120), and may have a respective label (such as those listed in data structure 100 under dataset labels 122). By generating and processing feature inputs through machine learning models, the system enables evaluation of datasets for the purpose of machine learning training and inputs. For example, processing feature inputs through a machine learning model enables calculation of model error indicators for a given dataset through a machine learning model, enabling more accurate and efficient labeling decisions for future labels.

The system may generate an output for the machine learning model. In disclosed embodiments, an output may include a dataset or a datum that has been produced from a machine learning model. In some embodiments, outputs may include predictions to phenomena based on feature inputs. For example, a machine learning model may receive, as input, chatbot text data from a user regarding satisfaction with the chatbot service. The system may categorize this input data as being related to user satisfaction and may further process this input data to predict a satisfaction level for the user. In some embodiments, an output may be used for training purposes. For example, an output may include a prediction that is compared against a training dataset to determine an error for the prediction. Based on this error, the system may, alternatively or additionally, determine a model error indicator, as discussed above. Thus, by determining outputs for machine learning models, the system may enable evaluation of model performance relating to the labeling of input datasets (e.g., the labeling of feature inputs), and, as such, may enable improved predictions and suggestions for labeling decisions.

The system may utilize dataset identifiers. In disclosed embodiments, a dataset identifier may include information that uniquely identifies a dataset. In some embodiments, a dataset identifier may include a dataset name, such as a filename or another alphanumeric identifier of the data. For example, a dataset identifier may include a path to the location of a dataset in a file system (i.e., a dataset address). In some embodiments, a dataset identifier may include a number uniquely identifying the dataset, such as those presented as dataset identifiers 120 within data structure 100. In some embodiments, a dataset identifier may include a list, array or pattern of individual data included within the dataset. For example, a dataset identifier may include a list of datum identifiers 130, where each datum identifier identifies a datum within the dataset. In some embodiments, the dataset identifier may be included within a field in a label record, such as a field corresponding to dataset identifiers 120 within data structure 100. In some embodiments, a dataset identifier may include a combination of a dataset address, such as a path to a file location, and a last version creation time. In disclosed embodiments, a last version creation time may include an indication of a time at which a version of the dataset was created. For example, a last version creation time may include a timestamp of the last modification of the dataset (e.g., addition or deletion of a datum to the dataset), which enables the system to uniquely track a dataset referred to within the label record database. By including a dataset identifier that uniquely identifies a dataset, the system may ensure that the label record database, as well as any other contextual information related to a label, may be linked directly to the corresponding datasets. Thus, the system may ensure that datasets may be labeled consistently and may track all labels associated with a given dataset, which improves the uniformity and accuracy of feature labels across datasets and enables tracking labeling decisions of datasets by the different labelers or at different times.

The system may utilize labels. In disclosed embodiments, a label may refer to a name, tag, or marker of a datum or dataset for use in a machine learning model. For example, a label may classify or describe a text string describing a set of data. For example, data arising from wind observations for weather predictions may be associated with a label such as "Wind Observations." In some embodiments, a dataset itself may be associated with multiple labels. For example, as shown in data structure 100 within label records 112, 116 and 118, Dataset 1 may be associated with labels "Error Type" and "Issue Type." In some embodiments, data themselves are associated with different labels. For example, as shown in data structure 100 within label records 112 and 114, datum 315 may be associated with labels "Error Type" and "Fix Type." In some embodiments, a datum may be associated with a dataset, which in turn is associated with a particular label. Labels enable data to be associated with meaningful, associated labels that provide context such that machine learning models may learn from the data. For example, labels may indicate whether a dataset includes words (e.g., textual data), and may indicate a classification or a category for the given dataset. Labels may also enable mapping of data to the various features or independent variables for the machine learning model. Labels aid in training machine learning models, as they provide structure to unlabeled data and, therefore, transform data into a form that may be used for training machine learning models further. As such, by including labeling information within a label record database for datasets, the system enables improved tracking and consistency of labels to ensure accuracy and to reduce duplication or subjectivity for labeling tasks.

In some embodiments, the system may include a new label. In disclosed embodiments, a new label may include a label for a datum or a dataset that has not been assigned previously. For example, a new label may include a new name or category for a previously-labeled dataset, or a new name or category for a new dataset that was previously unconsidered. For example, for a training datum previously categorized as "Error Type" (e.g., datum "315.txt" as shown in label record 112 in FIG. 1), a new label may include a subsequent categorization of the datum as "Fix Type" (e.g., datum "234.txt" as shown in label record 114 in FIG. 1). The system may categorize the first label as a pre-existing label. In disclosed embodiments, a pre-existing label may refer to a label that has already been applied to a dataset or a datum. By detecting the creation of a new label and considering pre-existing labels that may have been assigned to a particular training datum, the system may detect when there is inconsistency within labeling and may, subsequently, resolve the inconsistency, for example, through similarity metrics with other labeled datasets. By doing so, the system may ensure that any training data passed to a machine learning model is adequately categorized, leading to improved model performance.

The system may utilize modified labels. In disclosed embodiments, a modified label may include a label changed or recommended by the system. For example, if the system detects that there are multiple labels associated with a dataset, in some embodiments, the system may determine a label for the dataset based on other similar datasets (e.g., through similarity metrics). Having made this determination, the system may generate a recommendation for a modified label. By doing so, the system may make deterministic decisions regarding inconsistencies in labeling, enabling tie-breaking in situations where multiple labels may be applied to the same data or datasets. As a result, the system enables more accurate, consistent and efficient labeling of datasets or data.

The system may utilize label types. In disclosed embodiments, a label type may include a designation, marker, categorization or classification of a label for a datum or a dataset. In some embodiments, for example, a label type may indicate that a label is a "draft." In some embodiments, a label type may be indicated as a field within a label record database (as shown in FIG. 1, as datum label types 132). The system may determine a label type by determining whether all data used to generate a final label has been received. For example, a system may continually receive real-time processed data (e.g., dynamically-produced instant messages for a chatbot), and may determine that, during the chatbot conversation itself, any data that is labeled may only include a "draft"-type label (e.g., a first label type). The system may determine that a label is a final label. In disclosed embodiments, a "final label" may include a label for a datum or a dataset that has been fully processed or received. For example, the system may continually receive real-time processed data (e.g., dynamically-produced instant messages for a chatbot). After receiving all real-time processed data, such as at the end of the chatbot interaction, the system may issue a final label for the datum, as the datum has been fully received. For example, in data structure 100, data "124.txt." "135.txt" and "315.txt" have all been labeled with a label type corresponding to "Final" within label record 118 in FIG. 1. By producing a final label based on categorization of data, the system may distinguish between preliminary and final categorizations or labels for data, thereby improving model training decisions and evaluations of model output that may be based on either preliminary or final data.

The system may generate and/or utilize label records. In disclosed embodiments, a label record may include information regarding labels for a dataset or a datum. For example, a label record may indicate a modification to a label for a datum or a dataset, such as a change in label, or a change in data included within a training dataset. For example, FIG. 1 depicts label records 112-118, which may include information for datasets (e.g., identified by dataset identifiers 120), labels (e.g., shown through dataset labels 122), as well as modification timestamps 124 for when modification of the label occurred. In some embodiments, label records may be generated due to label modification requests by user identifiers, and information regarding the modifier of the label may be included (e.g., as modifier identifiers 126). In some embodiments, the label record may indicate a model error indicator, which may include information regarding model performance in response to a given labeling decision (e.g., model performance of a model trained by the given dataset indicated in the label record). By generating label records and including this contextual information regarding labeling decisions, such as who made the labeling decision, and what datasets or data to which the labels apply, the system may document, record, and learn from past labeling decisions in a way that enables contextualization and consistency within dataset labels. By doing so, the system may enable more accurate and efficient machine learning models, by minimizing inconsistencies, duplicates or errors within training data.

The system may generate and/or utilize label record databases. In disclosed embodiments, a label record database may include information regarding label records, such as in a data structure. For example. FIG. 1 depicts data structure 100 as representing a label record database. A label record database may include a database, list, or array of label records, which may each correspond to the same or different datasets. As stated above, label records within the label record database may include information regarding datasets (e.g., dataset identifiers 120), dataset labels 122, modification timestamps 124, modifier identifiers 126, model error indicators 128, datum identifiers 130 and/or datum label types 132. The label record database may be accessible to labelers, users, or modifiers of the system, for example. By including a label record database, labelers may access information regarding prior labeling decisions as related to datasets or data, which improves labeling consistency and accuracy. Auditing and troubleshooting previous labeling decisions may also be possible, due to the accessibility of this transparent trail of decisions.

The system may utilize modification timestamps. In disclosed embodiments, a modification timestamp may include an indicator of a time corresponding to a modification of a dataset, datum, machine learning model, or label thereof. For example, a modification timestamp may include a date and time for a label modification request by a user. In some embodiments, a modification timestamp may include a time when a given labeled dataset was input into a machine learning model, such as for training. Alternatively or additionally, a modification timestamp may be determined through a temporal identifier that is standardized across the computer network, and may be recorded within a label record (e.g., as modification timestamps 124 shown in FIG. 1). In some embodiments, the time corresponding to the modification timestamp may correspond to a time at which the dataset associated with the label record or label modification request was input into a machine learning model. By doing so, the system may ensure that all modifications to labels for datasets or data include information about when the change was made, such that labelers may take advantage of contextual information to inform further labeling decisions. For example, if a dataset has been labeled with three different labels historically, the system may preferentially treat the latest label by determining the label that was applied most recently through the modification timestamp. By doing so, the system may make more accurate, relevant labeling decisions that may be consistent with dataset treatment at the time of the decision, avoiding obsolescence or incompatibility with more current datasets.

The system may use temporal identifiers (e.g., to determine modification timestamps). In disclosed embodiments, a temporal identifier may include any marker of a date, time, or sequence of events. For example, a temporal identifier may include a time, date and number of seconds according to a system clock. For example, a temporal identifier may include a standardized setting for recording times across a computer network to which the system is connected. In some embodiments, a temporal identifier may include a rank or ordinal number for the occurrence of an event (e.g., the recordation of a label record) in relation to other events. By using a temporal identifier as the modification timestamp, the system ensures that there is a standardized way to record times in a way that is consistent across all devices and/or users interacting with the system.

The system may determine a record timestamp and/or a request timestamp. In disclosed embodiments, a record timestamp may include a temporal identifier and/or modification timestamp that corresponds to a label record for a pre-existing label. The system may, additionally or alternatively, determine a request timestamp for a label modification request, which may correspond to a time at which the label modification request was received by the system, for example. By doing so, the system may measure how often the label for a particular dataset or datum is being changed or modified and, as such, may determine which data or datasets may be contentious or undecided by labelers, enabling labelers to take extra care in labeling such problematic data prior to machine learning model processing.

The system may include similarity metrics. In disclosed embodiments, a similarity metric may include any measure of similarity between data, datasets and/or labels. For example, a similarity metric may be related to an inverse of a distance metric, and may represent any function of datasets or data that exhibit large values for similar objects and low values for dissimilar objects. In some embodiments, a similarity metric may correspond to a cosine similarity between two text strings (e.g., for textual data). For example, as shown in FIG. 2, in some embodiments, the system may determine similarity metrics of a datum (e.g., training datum 202) with respect to data within a dataset (e.g., as represented by vector representations 206 of data in a dataset). For example, the system may vectorize the training datum to form vector representation 204, and pass both the vector representation of the datum and the vector representations of data in a dataset into natural language processor 208 in order to determine similarity metrics 210. For example, the natural language processor may determine text distances between a datum and each data within the dataset (e.g., cosine distances in a vector space model) and generate a similarity metric based on these text distances. By doing so, the system may objectively determine similarity between textual data, while leveraging lexical and syntactical information within the analysis through the natural language processor. In some embodiments, the natural language processor may generate these similarity metrics without recourse to text distances, simplifying the calculation. Additionally or alternatively, the system may generate similarity metrics without a natural language processor by comparing vector representations of the datum and the respective data within the dataset. For example, the system may calculate bag-of-words vector representations of the textual data and each datum within the dataset and compare these (e.g., by calculating a normalized inner product between the vector representations). Generating similarity metrics between textual data without use of a natural language processor may enable faster, more efficient calculations, as less computational power may be required for vector manipulation and analysis when compared to natural language processing or other machine learning techniques. In some embodiments, the system may determine similarity metrics between two different labels, such as those determined at different times for the same training datum. For example, the system may determine a label similarity metric by comparing the text within labels, and use this similarity metric to determine whether to generate a warning based on a label similarity threshold. By generating similarity metrics, the system may objectively determine whether datasets or labels are related to each other, and, as such, the system may make improved recommendations for labels for both pre-existing datasets and new data received.

By leveraging an objective metric, such as similarity metrics, the system may reduce the effect of human bias, error or inconsistencies in labeling tasks, leading to improved machine learning outcomes (e.g., lower model error indicators).

In disclosed embodiments, a label similarity metric may include a similarity metric calculated between two labels. For example, a label similarity metric may include a similarity metric calculated by comparing text strings within two different labels, as described above. In some embodiments, the label similarity metric may be compared to a label similarity threshold, which may represent a similarity metric below which the system may determine a change in the labeling of the corresponding datum. By generating label similarity metrics, the system may compare labels that have already been generated for lexical similarity in a manner that enables analysis and reduction of duplicate labels or inconsistencies within labeling. For example, two datasets that are labeled with similar but non-identical labels may be merged if the system determines a high enough similarity metric. In some embodiments, the system may generate a warning if the system predicts different labels for the same datum (e.g., if the nature of the datum changes as further real-time processed data is received), as these different predictions may signal to a labeler that further analysis (and, perhaps, division of the data) may be required, as the nature of the data may have changed over time. Thus, by comparing labels to generate label similarity metrics, the system may track and manage any inconsistencies generated within labels for data within the system, leading to improved model performance and reducing the need for troubleshooting where data may have been incorrectly labeled.

The system may utilize natural language processing models (such as natural language processor 208). In disclosed embodiments, a natural language processing model may refer to a model, algorithm, or process to analyze natural language data, such as language arising from humans. In some embodiments, natural language processing models may be symbolically coded or manually coded, such as through the generation of rulesets for analyzing language. Natural language processing models may utilize machine learning models or algorithms, in some embodiments. For example, a natural language processing model may be capable of generating vectorized representations of textual data, such as through a bag-of-words algorithm or a word2Vec algorithm. A word2Vec algorithm may capture semantic and syntactic qualities of words in such a way that distances between vectors may indicate levels of semantic dissimilarity between the words represented by those vectors, for example. In some embodiments, a natural language processing model may accept vector representations of textual data as input, and may categorize data into labels, for example, or generate similarity metrics between the vector representations. Examples of natural language processing models may include optical character recognition, where input data may be in the form of unprocessed text. In some embodiments, natural language processing models may include speech recognition, such that the system may receive data as audio files and may transcribe the speech-to-text using speech recognition. In some embodiments, the natural language processing model may interface with another machine learning model in order to both process incoming data and determine, based on the label record database, labels for the given data. For example, the system may utilize a sentiment analysis model to label respective data into sentiments. In some embodiments, the natural language processing model may enable the system to maintain syntactic, lexical, and morphological information and consider this information throughout the analysis. By utilizing natural language processing models for label creation and model analysis, the system enables objective analysis of incoming text data without the need for human intervention; as such, the system enables improved consistency and mitigates the risk of human error.

The system may use vector representations of data. In disclosed embodiments, a vector representation may include a representation of data in vector space. For example, vector representations may include word embedding of textual data into vectors. In some embodiments, the system may generate vector representations of textual data such that syntactical, morphological and lexical information of the textual data is preserved within the vector representations. For example, the system may use a bag-of-words model, where words are represented as vectors based on the number of occurrences of a given word within textual data. In some embodiments, the system may vectorize the words using a term frequency-inverse document frequency (TF-IDF) model to reflect the importance of words in textual data based on a collection or corpus of text data. In some embodiments, syntactic and lexical information may be reflected within a vector representation using a word2vec algorithm, where semantic similarity may be represented through a cosine similarity between vectors (e.g., related to an inner product between vectors). In some embodiments, the system may utilize natural language processing models to generate vector representations of data. By generating vector representations of data, textual data may be stored in the system more uniformly, enabling direct comparisons between textual datasets, for example. Vector representations may improve the efficiency of further processing data through machine learning models, as numerical vectors and arrays may be more readily processed. Thus, vector representations of text data may improve the efficiency and portability of labeling decisions, by providing a uniform way of comparing and processing training data.

The system may calculate or use text distances. In disclosed embodiments, a text distance may include a metric that describes dissimilarity between two texts, such as text data or datasets. A text distance may include a measure of how many edits are required to transform one text string to another text string, such as a Levenshtein Edit Distance or a Hamming Distance. In some embodiments, the system may compute cosine similarity between two texts, formed by vectorizing the text data (e.g., generating vector representations, as described above) and calculating a cosine distance between the vectors in the n-dimensional vector space representing the texts. By calculating a cosine distance, the system may compare text data that may be of different vector lengths, enabling a normalized representation of similarity between two vectors. In some embodiments, the system may calculate Euclidean distances between vector representations of text data for text distance. In this case, Euclidean distances may provide information about textual data length as well, as well as other syntactic information, as opposed to cosine similarity. By calculating text distances and basing labeling decisions on these distances, the system may leverage uniform, mathematical, objective measures for measuring data similarity, leading to improved consistency and reduced bias in labeling decisions.

The system may generate and/or utilize update rates. In disclosed embodiments, an update rate may refer to a rate at which a label is modified for a datum or a dataset. For example, an update rate may be expressed as a frequency of label records modified for a particular dataset or datum. In some embodiments, the system may calculate an update rate based on a time elapsed between two modifications of a label (e.g., two labels determined for the same datum over the course of time, for real-time processed data that is continually received at the system). In some embodiments, the system may calculate an average update rate based on a determination of a list of label records associated with a particular dataset. For example, the system may determine a list of label records that are associated with a dataset identifier, and determine how many label modifications were carried out for this dataset, and over what period of time. Based on this period of time and the number of label modifications, the system may calculate an average update rate for the particular dataset. In some embodiments, this average update rate may be similarly calculated for a training datum rather than a dataset. By calculating an update rate (or an average update rate), the system may extract information about data or datasets that may be modified frequently, which may signal consistency, consensus or collaboration issues between various labelers. Thus, tracking update rates enables the system to warn labelers or administrators of datasets, data, or labels that may be problematic and frequently modified, which efficiently flags and isolates datasets that may be more difficult to label. Thus, the system enables more efficient troubleshooting and monitoring.

In some embodiments, the system may compare update rates or average update rates with a threshold update rate. In disclosed embodiments, a threshold update rate may be a value for an update rate above which the system may flag a problem. For example, a threshold update rate may be specified by an administrator or labeler, and may reflect a frequency above which label modification may signify serious inconsistency, lack of consensus or data processing issues. By comparing the (average) update rate with a threshold update rate, the system may warn labelers or other users of issues, and may enable manual review and evaluation of labeling of a dataset, for example. Thus, by comparing average update rates or update rates for label modifications with a threshold update rate, the system may continually track and monitor any issues that may arise due to labeling that may be the cause of such frequent re-labeling of datasets.

The system may use or receive real-time processed data. In disclosed embodiments, real-time processed data may include data that has been produced, processed, or received dynamically, in real-time. For example, real-time processed data may include live chatbot data that is arriving before the end of a chatbot conversation, or before the full conversation has been fully processed. In some embodiments, real-time processed data may include audio data or other data that may be streamed online through the internet. Real-time processed data may also include dynamic data, i.e., information that may be periodically updated as new information becomes available. Real-time processed data may originate in a data stream. In disclosed embodiments, a data stream may include data or information that is transmitted as a continuous flow. In some embodiments, a data stream may include a chatbot conversation as it is being produced in real time. Thus, a data stream may act as a source of real-time processed information that the system may receive.

The system may use or receive batch-processed data. In disclosed embodiments, batch-processed data may include data that may not substantially change. For example, batch-processed data may include a full transcript of a terminated chatbot conversation. In some embodiments, batch-processed data may include static data or persistent data, which may include data that is unlikely to change or be modified. Because both real-time processed data and batch-processed data may need to be labeled, the system may handle this data by assigning labels associated with this real-time processed data, a label type that indicates the data has not been fully processed. By doing so, the system may provide labelers and other users of the data further information and context regarding the quality of this data, such as whether the data may be expected to change in the future. Thus, labeling decisions and model training decisions may take advantage of this label type information to make more informed decisions (such as which datasets to include within a training routine), leading to reductions in model errors and improvements in model consistency.

The system may receive or use completion messages. In disclosed embodiments, a completion message may include any signal, message, information or data that indicates an end of receiving data. For example, the system may receive textual data, such as the phrase "Goodbye.", that indicates the termination of a transmission of real-time processed data (e.g., live chatbot data). In some embodiments, the completion message may include a code, marker, or other technical indication of the end of a data packet received at the system. For example, the system may receive an alphanumeric text string that stamps the end of a chatbot interaction. By receiving completion messages, the system may determine whether received data is finalized or not and, therefore, the system may determine a label type for a label applied to the data. By doing so, the system may more accurately evaluate and make data processing decisions, based on the type or status of a label and the associated data. Thus, the system may improve model training decisions, such as which datasets to include within machine learning model training, and may evaluate model outcomes based on the types of the labels applied to the input data.

In some embodiments, the system may determine, receive, or use a threshold elapsed time. For example, a system administrator may determine that real-time processed data may be finalized after a threshold elapsed time has passed. For example, the system may determine that no real-time processed data has been received for longer than the threshold elapsed time and, based on this determination, the system may handle the data as though it has been finalized. By detecting when data may be fully received and, therefore, ready for a final-type label, the system may correctly label data that may be finalized and, as such, may enable labelers and other users to use the data accordingly. For example, based on a determination that a label corresponding to this data is final, the system may indicate this on the label record corresponding to the data, and a labeler may decide to include the data within a machine learning model training algorithm. Thus, by detecting when data may be final, the system may more efficiently process data and train machine learning models by determining a final label sooner.

Figure 3:
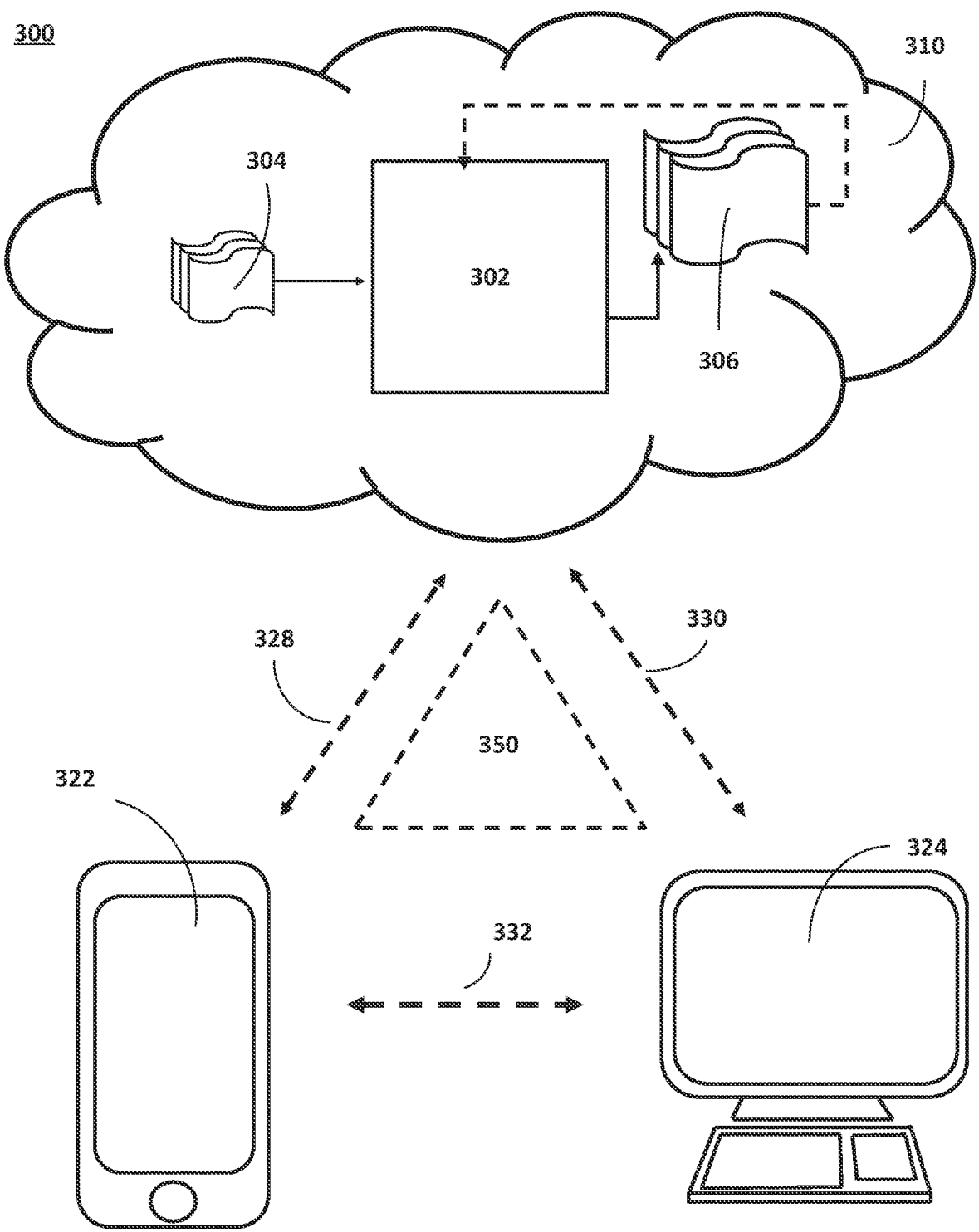
FIG. 3 shows illustrative components for a system used to record and generate labels for chatbot data for machine learning model input, in accordance with one or more embodiments.

FIG. 3 shows illustrative components for a system used to document label versions for machine learning input data, in accordance with one or more embodiments. For example, FIG. 3 may show illustrative components for producing label versions for chatbot data that may be used as artificial neural network training data. Additionally or alternatively, system 300 shown in FIG. 3 may also be used for selecting labels based on dataset similarity for machine learning training data. Additionally or alternatively, system 300 may be used for generating recommendations for unlabeled training data for machine learning models. Additionally or alternatively, system 300 may be used for generating labeling data for machine learning model training for both real-time data and batch-processed data streams. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include data structures, such as data structure 100 (e.g., a label record database), which may include label records 112-118. Dataset identifiers 120, dataset labels 122, modification timestamps 124, modifier identifiers 126, model error indicators 128, datum identifiers 130 and/or datum label types 132 may be included within cloud components 310, for example, in cloud storage.

Cloud components 310 may access input data, such as training data, datasets, real-time processed data or batch-processed data, which may be received from mobile device 322 or user terminal 324, for example, through communication paths 328, 330 or 350.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a prediction for a label associated with unlabeled data, or a prediction for which label may fit a datum best out of a choice of labels).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., which labels with which to label).

In some embodiments, the model (e.g., model 302) may automatically perform actions based on outputs 306. In some embodiments, the model (e.g., model 302) may not perform any actions. The output of the model (e.g., model 302) may be used to predict or categorize user experience information from chatbot interactions. For example, the output of the model may determine a sentiment or type of data based on input textual data.

System 300 also includes API layer 350. API layer 350 may allow the system to generate summaries across different devices. In some embodiments. API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC. Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
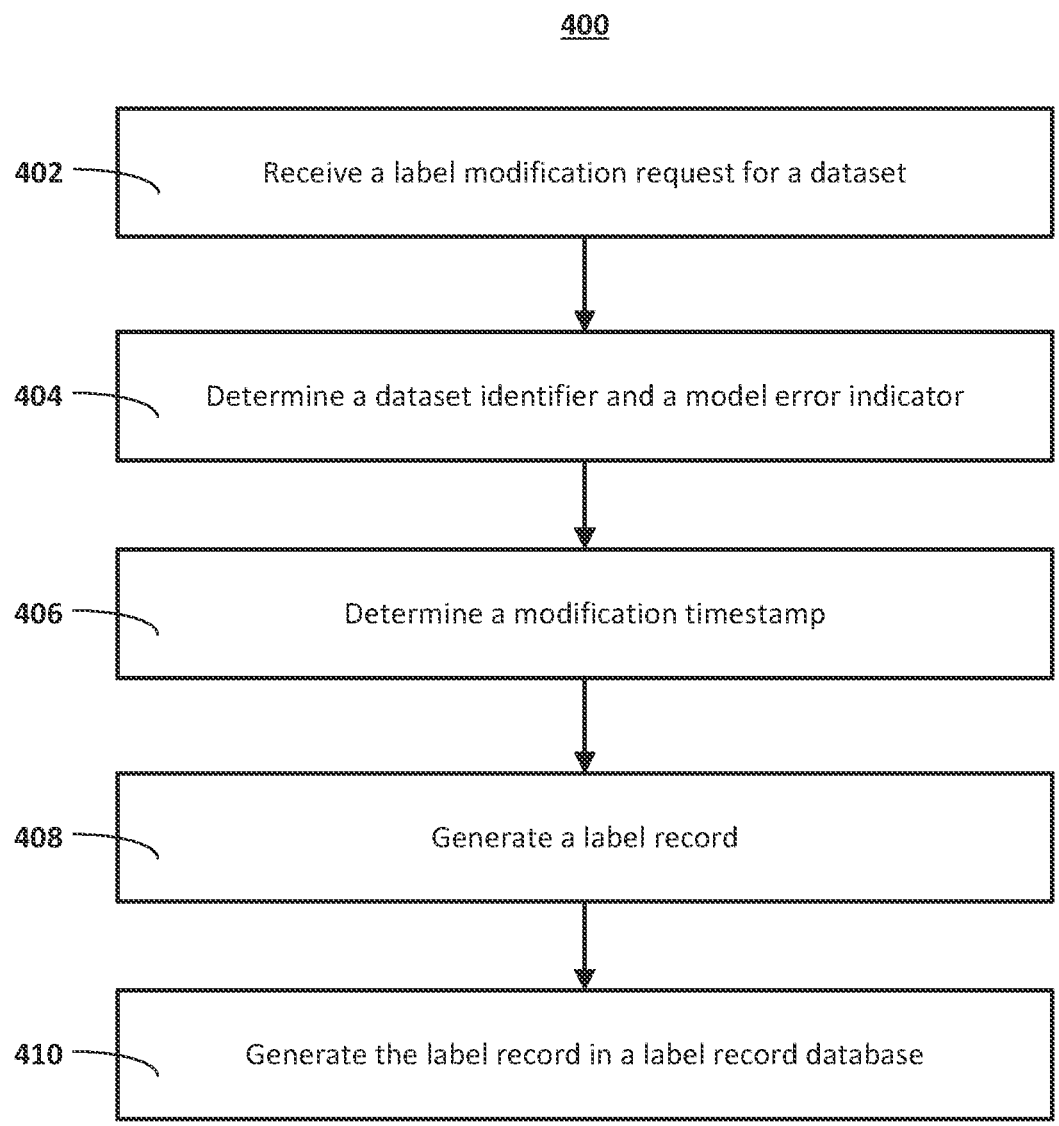
FIG. 4 shows a flowchart of the steps involved in document label versions for chatbot data for machine learning model input, in accordance with one or more embodiments.

FIG. 4 shows a flowchart of the steps involved in documenting label versions for machine learning model training data, in accordance with one or more embodiments. For example, the system may use process 400 (e.g., as implemented on one or more system components described above) in order to train artificial neural network input datasets based on chatbot conversation text data.

At operation 402, process 400 (e.g., using one or more components described above) may receive a label modification request for a dataset. That is, the system may receive, at a device on a computer network, a label modification request for a dataset. For example, the system may receive a data structure that includes information about a label for a dataset or datum. The label modification request may include information about the dataset or datum for which the label modification request may be made (e.g., a dataset or datum identifier, such as a filename, a serial number, or a file path/address). The label modification request, in some embodiments, may include a modification timestamp or a request timestamp, as well as a model error indicator, which may provide information about the performance of the dataset after training machine learning model with this dataset. The label modification request may be in the form of a data structure (e.g., similar to one of label records 112-118 as shown in FIG. 1), or may be received through an electronic form or message. By receiving a label modification request, the system may ensure that any modification to labels may be tracked and monitored, such that the system and labelers may take advantage of information regarding past labeling decisions. By including information that may be relevant to decision makers, such as model performance and dataset identification information, the system may ensure that any records of label modifications are descriptive and unambiguous.

In some embodiments, the system may determine whether all data used to generate a final label has been received or not, and, in response, assign a corresponding label type to the label. That is, the system may determine whether all data used to generate a final label for the dataset has been received. In response to determining that not all data used to generate the final label for the dataset has been received, the system may assign a first label type to the label in the label record corresponding to the dataset. For example, the system may determine whether the data within the dataset has been received (e.g., whether there has been a sufficiently long pause in receipt of data for the dataset). The system may then assign a label type to the label record that reflects the fact that this data has not yet been received (e.g., a label of the "draft" type). The system may make this determination by, for example, querying a user submitting the label modification request. In some embodiments, the system may determine that the dataset does not include a completion message or any other indication of complete data receipt and, in response, may make a corresponding determination of a label type. By doing so, the system may ensure that dynamically-received data may be considered, evaluated or tested before data receipt has been complete, enabling more efficient processing and labeling of this data. The system may then finalize the label once all data has arrived, which may also assist labelers in labeling decisions.

At operation 404, process 400 (e.g., using one or more components described above) may determine a dataset identifier and a model indicator. That is, the system may, in response to the label modification request, determine a dataset identifier and a model error indicator. For example, in some embodiments, the system may parse the label modification request for information regarding a corresponding dataset, as well as a model error indicator. A dataset identifier associated with the label modification request may include a filename, a file path, or a list of files/data that is associated with the dataset, for example. The system may extract this dataset identifier from a field associated with the dataset within the label modification request, for example. In some embodiments, the system may determine a model error indicator likewise, such as by searching, within the label modification request, for a field associated with the dataset's performance within a machine learning model. By determining a dataset identifier, the system ensures that the dataset corresponding to the label modification request (e.g., a label associated with the request) is unambiguous. By determining a model error indicator, the system generates information that may be useful in evaluating a labeling decision, such as a decision as provided in the label modification request, or a future decision by labelers. Thus, the system may contextualize and extract useful information from the label modification request, aiding in further evaluation and processing of machine learning model training data.

In some embodiments, the system may determine the dataset identifier through determination of a dataset address and a last version creation time. That is, the system may determine, for the dataset associated with the label modification request, a dataset address and a last version creation time. Based on determining the dataset address and the last version creation time, the system may generate the dataset identifier such that the dataset identifier uniquely identifies a combination of the dataset address and the last version creation time. For example, the system may receive, through the label modification request, a dataset address and a version creation time and input these two pieces of information in a function (e.g., a hash or a serial number), to generate a unique identifier of the dataset. By doing so, the system may ensure that each dataset is uniquely identified by its most current version, through both the version's modification time as well as an address associated with the dataset. Thus, datasets may be uniquely identified and any ambiguities with respect to which dataset might be referred to in the label record may be settled.

In some embodiments, the system may determine the model error indicator by inputting the corresponding dataset into a machine learning model, generating output, and comparing output with a training dataset. That is, the system may locate the dataset associated with the label modification request and input this dataset into a machine learning model. The system may generate an output dataset from the machine learning model and, based on comparing the output dataset with a training dataset, the system may generate a statistical measure of error as the model error indicator. For example, the system may locate a dataset associated with the label modification request, such as by following an address associated with a dataset identifier. The system may input the dataset into a machine learning model, for example by implementing a training routine based on the dataset in question, using the label associated with the label modification request. For example, the system may input a dataset labeled as wind data into a machine learning model that may predict a weather forecast for the next week and, in response, may determine an error of the forecast (e.g., with respect to the true weather that occurred in the following week). The system may then generate a model error indicator that quantifies any error in the forecast by using a statistical measure, such as a mean-squared error of temperature values. By doing so, the system may encapsulate information regarding the performance of datasets depending on the label applied to the dataset and, as a result, contextual information regarding the effectiveness of a particular label is available to future labelers of the dataset. This operation enables the system to provide enhanced information to improve labeling decisions and reduce the need for trial-and-error during label operations.

In some embodiments, the system may compare the model error indicator with a threshold model error and generate a warning message accordingly. That is, the system may compare the model error indicator with a threshold model error. Based on determining that the model error indicator is higher than the threshold model error, the system may generate a warning for display on a user interface that the label modification request is invalid. For example, the system may determine a model error indicator by passing the dataset corresponding to the dataset identifier through a machine learning model and comparing the output with a training dataset. If a model error indicator is above a threshold model error indicator, the system may generate a warning, for display. By doing so, the system may identify any label modification requests that cause an unsatisfactory model performance, as determined by a minimum model error. Thus, the system enables monitoring the labeling of datasets that cause poor performance in relevant machine learning models, and may prevent a user or a labeler from modifying the label based on poor model performance. As a result, the system may improve machine learning model performance by mitigating errors and inaccuracies that are unsatisfactory.

At operation 406, process 400 (e.g., using one or more components described above) may determine a modification timestamp based on the label modification request. That is, based on receiving the label modification request, the system may determine a modification timestamp. For example, the system may generate a timestamp at the time of receipt of the modification timestamp based on a clock setting. In some embodiments, the system may determine the modification timestamp based on a stamp, field, or indicator included in the label modification request. By including a modification timestamp, the system may record and generate a sequence of events for labeling decisions, which provides context clues and additional information for labeling decisions. For example, a modification timestamp for a labeling decision that is recent may be given more priority or consideration than a less recent modification timestamp when making further labeling decisions. By doing so, the system may streamline and improve the applicability of labeling decisions to current data and/or datasets, enabling labelers to make improved labeling decisions.

In some embodiments, the system may determine the modification timestamp based on a temporal identifier and record this temporal identifier as the modification timestamp. That is, the system may receive a temporal identifier for a point in time, wherein the temporal identifier comprises a standardized setting for recording times across the computer network. The system may record this temporal identifier as the modification timestamp. For example, the system, upon receipt of the label modification request, may retrieve or make a request for a system clock setting, or any other setting that is standardized across the computer network. For example, the computer network may be linked to a network time server, such as one managed by the National Institute of Standards and Technology (NIST), such that any devices communicating with the computer network may exhibit synchronized time settings. By determining the modification timestamp based on such a setting that is standardized for recording times, the system may ensure that there are no ambiguities in label modification timelines, enabling the system to accurately determine the most recent labeling decisions. This process may be particularly useful in multi-user labeling tasks, where multiple users may submit label modification requests within a short period of time; thus, the system may accurately distinguish and characterize the label modification requests, for example, using this temporal identifier, and record this information as a modification timestamp. By doing so, the system ensures non-ambiguity and consistency within any records that are generated based on the received label modification request.

In some embodiments, the system may determine the point in time associated with the temporal identifier based on a machine learning model input time. That is, the point in time may be associated with a time at which the dataset associated with the label modification request was input into a machine learning model. For example, the system may determine the temporal identifier associated with the modification timestamp based on a point in time at which the dataset corresponding to the dataset identifier is used to train a relevant machine learning model. Thus, the modification timestamp may be associated with application of the dataset to a machine learning model, rather than with the label modification request itself. By determining the modification timestamp in this manner, the system may receive and generate records of labeling of the dataset based on actual use of the dataset. Thus, labelers may be able to synchronize or contextualize labeling decisions with, for example, outputs of the model that were produced subsequent to labeling, for troubleshooting or model evaluation purposes. Thus, the system enables labelers to receive improved information for more accurate labeling decisions.

At operation 408, process 400 (e.g., using one or more components described above) may generate a label record. That is, the system may generate a label record, wherein the label record includes the dataset identifier, the model error indicator, and the modification timestamp. For example, the system may generate one of label records 112-118, as shown in data structure 100 in FIG. 1. Each label record may include information (e.g., fields) that include information identifying the dataset (e.g., a dataset identifier), model performance (e.g., a model error indicator), and/or a timeframe for the label modification or creation (e.g., a modification timestamp). By including this information within a label record, the system may compile relevant information regarding a dataset associated with a label modification request and ensure that the information is consistent and stored together for easy access. By doing so, the system enables storage of data and information for a given dataset that may provide useful contextual information to labelers, with regard to labeling decisions for current and future datasets.

In some embodiments, the system may determine a field corresponding to dataset identifiers and populate this field within the label record with the dataset identifier. That is, the system may determine a first field corresponding to dataset identifiers for the label record. The system may populate the first field with the dataset identifier. For example, the system may determine which field within a data structure (e.g., a columnar data table as shown for data structure 100 in FIG. 1) for the label record corresponds to the dataset identifier and, in response, populate the field with the dataset identifier. The dataset identifier may include, for example, a file name linking to a location associated with the dataset or a corresponding alphanumeric identifier, where data in the dataset have been grouped together under the same label. By doing so, the system may ensure that the label record includes an identifier to the corresponding dataset, such that it is easily accessible and associated with the corresponding dataset. Without the dataset identifier within the label record, it may be difficult to determine which dataset is associated with a given label.

At operation 410, process 400 (e.g., using one or more components described above) may generate the label record within a label record database. That is, the system may generate the label record in a label record database, wherein the label record database includes a plurality of label records. For example, the system may locate a label record database (e.g., a data structure as in data structure 100 in FIG. 1) and append the label record to the label record database as a row (e.g., one of label records 112-118). The label record database may be stored in any of cloud components 310, for example, and may be accessible by, for example, mobile device 322 or user terminal 324. By storing label records in a label record database, the system compiles and/or aggregates information regarding labeling decisions, and enables this labeling history to be viewable by other devices connected to the system and/or the network. By doing so, the system aids decision-making for labelers and other users of datasets, for example, for machine learning training purposes. By receiving information within the label record database, such as dataset identifiers, modification timestamps and model error indicators, users may make labeling decisions based on contextual information directly related to specific datasets, such as the time of previous labeling decisions and resulting model performance information. As such, the system enables more efficient labeling of datasets and provides information for improved model evaluation and error mitigation resulting from these labeling decisions.

In some embodiments, receiving the label modification request may involve retrieving reference datasets and determining a label based on these datasets. That is, the system may retrieve a plurality of reference datasets corresponding to a plurality of dataset identifiers in the label record database. Based on comparing the plurality of reference datasets with the dataset, the system may determine a label for the dataset. For example, the system may retrieve datasets referred to in the label record database and compare these datasets with the training datum in order to generate a recommendation for a label. By doing so, the system may leverage historical labeling data regarding datasets to generate a recommendation for a new dataset's label, which enables more efficient and consistent labeling of data across the label record database by avoiding duplicate datasets that are given separate labels.

In some embodiments, determining the label for the dataset may include determining and comparing similarity metrics between the dataset and the reference datasets. That is, the system may determine a plurality of similarity metrics between the dataset and each reference dataset in the plurality of reference datasets within the label record database. Based on determining that a first reference dataset of the plurality of reference datasets has a highest similarity metric of the plurality of similarity metrics, the system may determine the label for the dataset. For example, the system may determine average similarity metrics between each datum in the dataset and each datum in each reference dataset. In some embodiments, the system may vectorize data within the dataset, use a natural language processing model, and determine similarity metrics between each datum within the dataset and each datum within the plurality of reference datasets, as shown in FIG. 2. By doing so, the system may determine whether a given dataset may be similar to other previously-labeled datasets. Based on this determination, the system may suggest a label for the dataset to a labeler, for example, on a user display. Thus, the system may leverage objective measures of similarity, as well as the historical data within the label record database, in order to aid in and improve decisions made by labelers within the system.

In some embodiments, the system may receive a user request for history related to a dataset identifier. The system may retrieve, and generate for display, the list of label records corresponding to this dataset identifier. That is, the system may receive a first user request, wherein the first user request includes a request for a label history corresponding to the dataset identifier. In response to receiving the first user request, the system may retrieve, from the label record database, a list of label records corresponding to the dataset identifier. The system may generate, for display on a user interface, the list of label records corresponding to the dataset identifier. For example, a user may request information about previous labels applied to a dataset used for training machine learning models in order to make labeling decisions, which the system may receive. In response to this request for a label history, the system may search through the label record database for all previous labels that were associated with the relevant dataset (as specified by the dataset identifier). Subsequently, the system may generate this information, in the form of a list of label records, for display on a user interface, such as when previous labels were applied, by whom, and what the model performance of the dataset was. By doing so, the system may enable users of datasets to track how a dataset of interest has performed and/or been labeled in the past. Thus, the system ensures that labelers may make more informed decisions on determining further labels for the datasets.

In some embodiments, the system may receive a user request for a suggestion for a new label for a given dataset. In response, the system may retrieve label records corresponding to the dataset identifier and, based on extracting model error indicators, recommend a label with the lowest model error indicator. For example, the system may receive a second user request, wherein the second user request includes a request for a suggestion for a new label name. In response to receiving the second user request, the system may retrieve, from the label record database, a list of label records corresponding to the dataset identifier. The system may extract a plurality of model error indicators, wherein each model error indicator in the plurality of model error indicators may correspond to each label record of the list of label records. Based on determining a lowest model error indicator of the plurality of model error indicators, the system may generate, for display on a user interface, a recommendation for the new label name. For example, a user may make a request for a recommendation for a dataset label for a training dataset to be used in a machine learning model, in order to improve the performance of the model. By determining the label name that improves model performance (i.e., a labeled dataset with the lowest model error indicator), the system may improve suggestions for labeling decisions for further received data. The system may retrieve label records that correspond to the dataset under consideration through a dataset identifier and, by comparing model error indicators for each label in the database, the system may determine a label record that exhibits the lowest model error within the database and, therefore, a highest model performance. Thus, the system may enable a display of the suggestion for a label name for the dataset, in order to improve the dataset's model performance. By doing so, a labeler may take advantage of contextual and/or historical data regarding a dataset's performance in a training model in order to make better decisions regarding labeling tasks.

In some embodiments, the system may display records corresponding to a user identifier in response to a user request. That is, the system may determine a user identifier in response to the label modification request and populate the label record with the user identifier. The system may receive a third user request, where the third user request comprises the user identifier corresponding to modification of the dataset. In response to receiving the third user request, the system may retrieve, from the label record database, a list of label records corresponding to the user identifier. The system may generate, for display on a user interface, the list of label records corresponding to the user identifier. For example, the system may determine which field within a data structure (e.g., a columnar data table) for the label record corresponds to the dataset identifier and, in response, populate the field with the dataset identifier. The dataset identifier may include, for example, a file name linking to a location associated with the dataset or a corresponding alphanumeric identifier, where data in the dataset have been grouped together under the same label. By doing so, the system may ensure that the label record includes an identifier to the corresponding dataset, such that it is easily accessible and associated with the corresponding dataset. Without the dataset identifier within the label record, it may be difficult to determine which dataset is associated with a given label.

In some embodiments, the system may determine an average update rate for the dataset and, based on this update rate, display a recommendation for a new label name. That is, the system may determine an average update rate corresponding to a list of label records associated with the dataset identifier. Based on determining that the average update rate is above a threshold update rate, the system may generate, for display on a user interface, a recommendation for a new label name, where the new label name may correspond to a recommended label record from the list of label records, and where the recommended label record may include a lowest model error indicator within the list of label records. For example, the system may retrieve the list of label records associated with the dataset identifier by searching for matches in the label record. Having retrieved the list of label records, the system may determine a time period over which the label records for the dataset identifier were modified and determine a number of modifications from the number of label records within the list. Thus, the system may determine an average update rate and compare this with a threshold update rate. If the update rate is above a certain threshold, the system may generate a warning for display, and may suggest a new label name to prevent further consensus issues, based on model error indicators (e.g., based on an indicator of model performance). By doing so, labelers may be notified of labels that frequently change, which indicates that consensus might not be reached on this labeling. Thus, labelers may subsequently devote attention to the corresponding datasets, and may receive recommendations from the system based on model performance, in order to improve the accuracy of labeling decisions and mitigate further labeling decisions that may hurt model performance.

Figure 5:
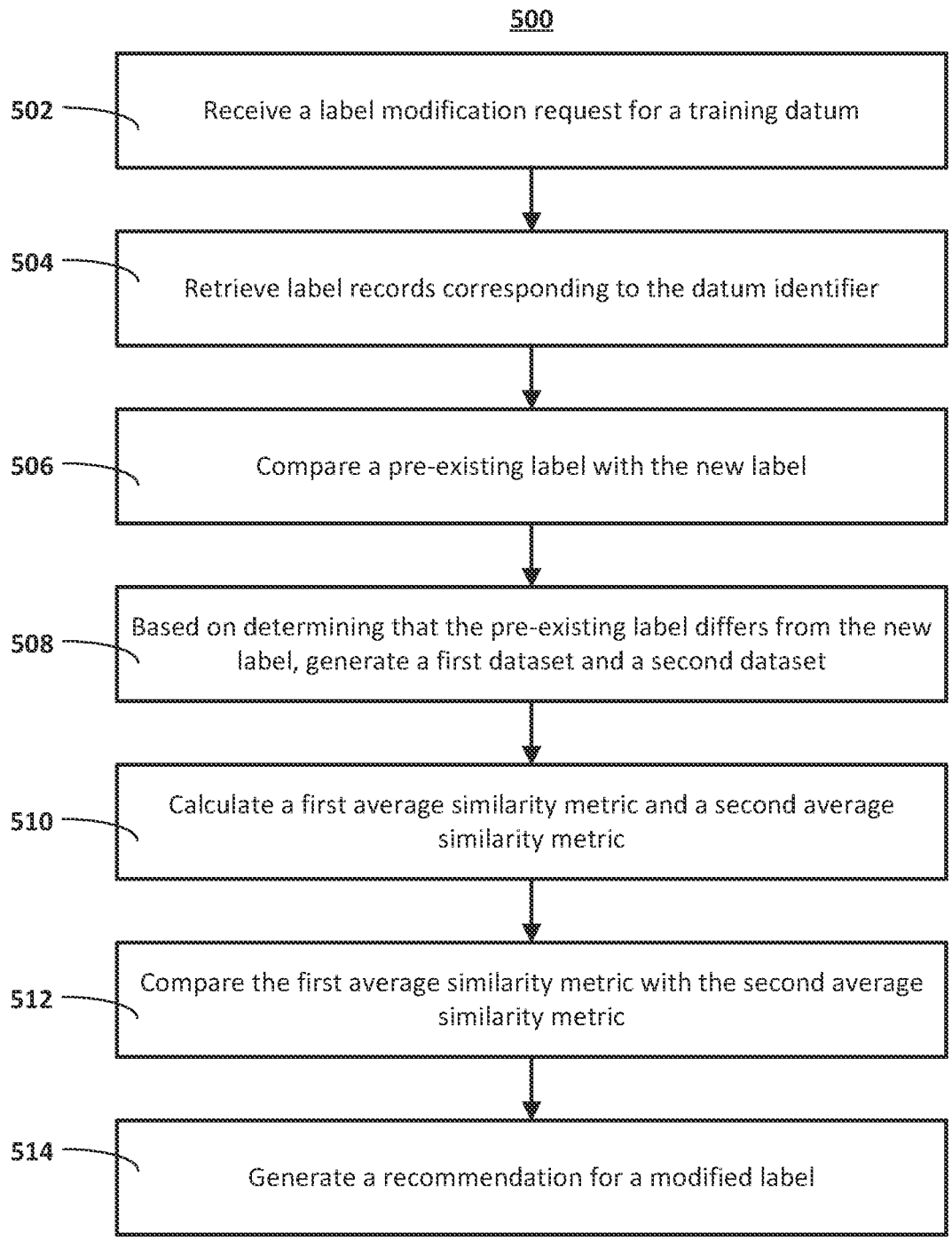
FIG. 5 shows a flowchart of the steps involved in selecting labels based on dataset similarity for chatbot text data for machine learning model input, in accordance with one or more embodiments.

FIG. 5 shows a flowchart of the steps involved in selecting labels based on dataset similarity for training data, in accordance with one or more embodiments. For example, the system may use process 500 (e.g., as implemented on one or more system components described above) in order to generate recommendations for labeling received chatbot text data based on similarity metrics, in order to break ties due to incompatible labeling decisions.

At step 502, process 500 (e.g., using one or more components described above) may receive a label modification request for a training datum. That is, the system may receive, at a device on a computer network, a label modification request for a training datum for a machine learning model, wherein the label modification request may include a new label and a datum identifier. For example, the system may receive information regarding a user's modification of a label for a training datum. For example, the system may automatically generate the label modification request when a user associates a particular training datum with a different label (e.g., places a training datum with another dataset that is labeled differently). In some embodiments, the label modification request may include a data structure, such as one of label records 112-118 shown in FIG. 1. The label modification request may include a new label, which may include a new label name or association of the training datum with another label. By receiving information regarding changes in a datum's associated label, including an identifier of the datum in question, the system may track situations where a training datum is made to be associated with multiple labels within the system. Thus, the system may track training data that may have conflicting or inconsistent labeling, enabling the system to monitor situations where labels may be erroneously or inconsistently applied.

At operation 504, process 500 (e.g., using one or more components described above) may retrieve a plurality of label records corresponding to the datum identifier. That is, the system may retrieve, from a label record database, a plurality of label records corresponding to the datum identifier. For example, the system may access the label record database and determine label records that include datum identifier, such as through matching a datum identifier with those listed in datum identifiers 130 in data structure 100, as shown in FIG. 1. Having found label records that include the datum identifier of the label modification request, the system may retrieve these label records for further processing. By doing so, the system may retrieve information to make a determination as to whether the datum may have been labeled inconsistently or differently in previous records or machine learning model training routines. By leveraging the label record database, the system may search through all previous instances of label modification for the datum and, therefore, may glean enough information to further mitigate the possibility of inconsistent labeling for the training datum. By doing so, the system may monitor whether the training datum may need further labeling decisions before being included in a training routine for a machine learning model.

At operation 506, process 500 (e.g., using one or more components described above) may compare a pre-existing label for the training datum with the new label. That is, the system may compare a pre-existing label from the plurality of label records with the new label. For example, the system may determine, based on the plurality of label records, a field corresponding to a label name for the label record (e.g., dataset labels 122 in data structure 100, as shown in FIG. 1). Based on the comparison, the system may determine whether some records of the plurality of label records may exhibit a different label name as compared to the new label provided in the label modification request. By doing so, the system may track situations where a training datum may be inconsistently labeled by, for example, different users, or for different models/applications. Thus, the system may flag situations that may lead to inconsistent labeling of the same datum, enabling the system to mitigate inaccuracies or errors in labeling prior to further machine learning model training.

At operation 508, process 500 (e.g., using one or more components described above) may, based on determining that the pre-existing label differs from the new label, generate a first dataset and a second dataset. That is, based on determining that the pre-existing label from the plurality of label records differs from the new label, the system may generate, based on the label record database, a first dataset labeled with the new label, and a second dataset labeled with the pre-existing label. For example, the system may determine that the new label may be inconsistent with previous labels that were applied to the training datum, after comparing the new label and a pre-existing label. Based on this, the system may determine a dataset that is labeled with the new label from the label record database. For example, the system may determine a set of label records that have already been labeled with the new label from the label record database by searching within a field corresponding to dataset labels (e.g., dataset labels 122 in data structure 100, as shown in FIG. 1). The system may, based on this determination, determine a dataset identifier corresponding to a label record with this new label and, based on this dataset identifier, the system may extract a dataset (e.g., through following a file path associated with the dataset identifier). The system may similarly determine a dataset corresponding to the pre-existing label based on dataset identifiers within the label record. By doing so, the system may leverage the label record database to find instances where other datasets may have been labeled similarly to the training datum in question. This operation enables the system to determine whether the training datum may have a lack of consensus in terms of labeling and whether the training datum may need further consideration to finalize a labeling decision. Thus, the system may monitor and mark any training data that may benefit from further evaluation due to inconsistent historical labeling.

In some embodiments, generating the two datasets may include comparing modification timestamps for the respective label records. That is, the system may generate, from the label record database, a first plurality of label records associated with the new label and a second plurality of label records associated with the pre-existing label. The system may generate a first plurality of modification timestamps corresponding to the first plurality of label records and a second plurality of modification timestamps corresponding to the second plurality of label records. Based on the first plurality of modification timestamps and the second plurality of modification timestamps, the system may determine a first label record for the new label and a second label record for the pre-existing label. Based on the first label record and the second label record, the system may determine the first dataset labeled with the new label and the second dataset labeled with the pre-existing label. For example, the system may decide between many datasets that may be labeled by the new label or the pre-existing label by determining the dataset with the latest modification time. For example, the system may extract label records corresponding to the new and pre-existing labels, and search within the label record database for modification timestamps (e.g., modification timestamps 124 in data structure 100, as shown in FIG. 1). By doing so, the system may ensure that the most updated labeling decisions within the label record database are considered in order to break ties between labeling decisions for the training datum. Thus, the labeling decision made by the system may be consistent with other recent labeling decisions made by, for example, other users, thereby improving model performance across labelers and users.

At operation 510, process 500 (e.g., using one or more components described above) may calculate average similarity metrics for the training datum with the datasets. That is, the system may calculate a first average similarity metric between the training datum and the first dataset and a second average similarity metric between the training datum and the second dataset. For example, the system may extract each datum from the appropriate dataset (e.g., a text string) and compare the datum with the training datum in order to determine a similarity metric. For example, the system may vectorize the data using a natural language processing model and calculate a cosine similarity between the two vectors. Thus, the system may determine to which dataset the training datum may be more similar based on an objective measure of similarity. By determining an average similarity metric, the system may ensure that the training datum must fit a dataset as a whole, rather than only individual data within the dataset. By doing so, the system may ensure consistency in labeling and may break ties where there is a lack of consensus in labeling decisions for a given training datum, leading to improved model accuracy.

In some embodiments, the system may calculate the average similarity metrics by first calculating a plurality of similarity metrics between the training datum and each datum within the datasets. That is, the system may calculate a first plurality of similarity metrics between the training datum and each datum of the first dataset and a second plurality of similarity metrics between the training datum and each datum of the second dataset. The system may calculate the first average similarity metric based on an average of the first plurality of similarity metrics and the second average similarity metric based on an average of the second plurality of similarity metrics. For example, the system may first generate the data from the first dataset and compare each training datum with each of these data. The system may do the same with the second dataset, and determine a similarity metric for each of these comparisons. For example, the system may use a machine learning algorithm, or a natural language processing algorithm, to compare textual chatbot data within the training datum and text data within each data in each dataset and generate similarity metrics accordingly. The system may then calculate average similarity metrics for the training datum with each of the two datasets. By doing so, the system may determine the recommendation for the modified label by comparing objective metrics between different candidate datasets corresponding to each of the labels that have been applied to the given training datum. Thus, the system may leverage these average metrics to break ties with respect to previous labels applied to the datum and, as such, generate a recommendation for a label that is not in conflict with these previous labels.

In some embodiments, the system may calculate the first plurality of similarity metrics by generating vector representations of the data and inputting these into a natural language processing model. That is, the system may generate, for use in a natural language processing model, a vector representation of the training datum and a plurality of vector representations corresponding to data in the first dataset. In response to inputting the vector representation and the plurality of vector representations into the natural language processing model, the system may generate the first plurality of similarity metrics. For example, the system may use a bag-of-words representation for textual chatbot data within the training datum, as well as for each datum in the first dataset. The system may then input the dataset into a natural language processing model, such as a named entity engine, in order to determine similarity metrics between the training datum and chatbot data within the first dataset. By doing so, the system may analytically determine measures of similarity between text data in question and any of the prior datasets labeled with a similar label and, as a result, the system may improve the efficiency and accuracy with which similarity is determined.

At operation 512, process 500 (e.g., using one or more components described above) may compare the first average similarity metric with the second average similarity metric. For example, the system may determine that the first average similarity metric, associated with the first dataset, may have a higher value than the second average similarity metric, associated with the second dataset. Thus, in comparing the two average similarity metrics, the system may determine the dataset to which the training datum is most similar and, based on this, may enable further labeling decisions based on the training data best matching a pre-existing dataset in the label record database. By doing so, the system leverages similarity metrics to aid labeling decisions such that labels may be consistent with other labeled data, leading to improved consistency in subsequent machine learning processing and reducing potential errors due to inconsistent labeling.

At operation 514, process 500 (e.g., using one or more components described above) may generate a labeling recommendation based on the comparison. That is, based on comparing the first average similarity metric with the second average similarity metric, the system may generate a recommendation for a modified label. For example, the system may determine that the average similarity metric of the training datum with respect to the first dataset is higher than with respect to the second dataset. Upon this determination, the system may retrieve the label associated with the dataset and may suggest a label for the training datum based on this dataset label. By doing so, the system may resolve inconsistencies in labeling decisions for a training datum based on determining similarity between the training datum and the datasets associated with the labels. Thus, the system may improve accuracy and consistency in labeling decisions, leading to improved machine learning model training and performance.

In some embodiments, the system may compare the two average similarity metrics and generate a recommendation for a label to include the new label based on this comparison. That is, based on comparing the first average similarity metric and the second average similarity metric, the system may determine that the first average similarity metric is higher than the second average similarity metric. Based on determining that the first average similarity metric is higher than the second average similarity metric, the system may generate the recommendation for the modified label to include the new label. For example, the system may determine the recommendation for a label by comparing average similarity metrics between the training datum and the datasets as a whole that have been labeled with a similar label. For example, the system may generate a similarity metric based on word distance within each chatbot text and the training datum. By doing so, the system may objectively provide a recommendation for a label based on the dataset with which the training datum is more similar and, as a result, reduce the chance of errors or inconsistencies in error labeling.

In some embodiments, the system may compare the two average similarity metrics and generate a recommendation for a label to include the pre-existing label based on this comparison. That is, based on comparing the first average similarity metric and the second average similarity metric, the system may determine that the second average similarity metric is higher than the first average similarity metric. Based on determining that the second average similarity metric is higher than the first average similarity metric, the system may generate the recommendation for the modified label to include the pre-existing label. For example, the system may compare the similarity metric calculated previously between chatbot data within a dataset and the training datum through natural language processing and, accordingly, may determine the dataset that is most similar to the training datum's chatbot data in order to generate a recommendation. By doing so, the system may suggest labels to data that closely matches the entirety of other datasets within the label record database and, as such, ensure that data that has already been previously-labeled is consistent with pre-existing datasets, improving machine learning model accuracy and consistency.

In some embodiments, the system may generate a modified label record in the label record database based on the recommendation. That is, based on the recommendation for the modified label, the system may determine a modified label record for the training datum, wherein the modified label record includes a modified label name, an updated modification timestamp, and the datum identifier. The system may generate the modified label record in the label record database. For example, the system may determine a modified label name (e.g., an alphanumeric string to categorize data for machine learning model input), a modification timestamp (e.g., a system time setting), and a datum identifier (e.g., a filename pointing to the new data) and add this data to the label record database. By doing so, any future data that must be labeled may take advantage of prior labeling decisions and label history, enabling the system to leverage this contextual data to make consistent suggestions for subsequent labels. In some embodiments, the system may generate a feature input and generate an output based on training the machine learning model with the training datum. For example, the system may use the modified label within a machine learning model (e.g., a label for chatbot data related to a query type) in order to generate or train predictions or outputs (e.g., whether the query was answered properly). By doing so, the system may test the label that was applied to the training data within the application, enabling further diagnostics, evaluations or analyses of the output, such that labeling decisions may be further improved.

In some embodiments, the system may determine a model error indicator based on the machine learning model output and record this in the label record database. That is, based on the first output, the system may determine a model error indicator. The system may generate a modified label record in the label record database, wherein the modified label record includes the model error indicator. For example, the system may determine a model error indicator based on determining an output from input data based on the modified label. For example, the system may determine an output regarding whether a query, as labeled by input, was answered properly based on the training datum, and compare this output with a customer satisfaction measure to verify whether the machine learning model produced errors. By doing so, the system may learn from model performance of a given labeling decision and insert this information within the label record database, in order to improve further labeling decisions and any resulting model performance.

In some embodiments, the system may detect another label record linked to the pre-existing label and re-analyze whether the training datum should be labeled based on this third dataset. That is, the system may detect, in the label record database, an updated label record for a third dataset labeled with the pre-existing label. The system may calculate a third average similarity metric between the training datum and the third dataset. Based on comparing the third average similarity metric with the first average similarity metric and the second average similarity metric, the system may determine an updated label for the training datum. The system may generate the recommendation for the modified label based on the updated label. For example, the system may detect the modification of the label record database due to the addition of another dataset that was labeled with the pre-existing label, and calculate whether the similarity metric has changed or not. By doing so, the system may update the recommendation for the modified label based on whether this third dataset is more similar than the original decision that was made. Thus, the system may adapt to the inclusion of new datasets with the same pre-existing labels, depending on similarity, which enables consistent model performance even as further dataset labeling decisions occur.

In some embodiments, the system may detect another label record linked to the new label and re-analyze whether the training datum should be labeled based on this fourth dataset. That is, the system may detect, in the label record database, an updated label record for a fourth dataset labeled with the new label. The system may calculate a fourth average similarity metric between the training datum and the fourth dataset. Based on comparing the fourth average similarity metric with the first average similarity metric and the second average similarity metric, the system may determine an updated label for the training datum. The system may generate the recommendation for the modified label based on the updated label. For example, the system may detect the modification of the label record database due to the addition of another dataset that was labeled with the new label, and calculate whether the similarity metric for data associated with the new label has changed or not. By doing so, the system may update the recommendation for the modified label based on whether this fourth dataset is more similar than the original decision that was made. Thus, the system may adapt to the inclusion of new datasets with the same pre-existing labels, depending on similarity, which enables consistent model performance even as further dataset labeling decisions occur.

In some embodiments, the system may determine whether all data has been received for generating the modified label and assign a label type accordingly. That is, the system may determine whether all data used to generate the modified label for the training datum has been received. In response to determining that not all data used to generate the modified label for the training datum has been received, the system may assign a first label type to the modified label. For example, the system may determine that the training datum is dynamically-received chatbot data (e.g., through a real-time chatbot conversation with a user) and, based on this determination, may determine that any label may be preliminary (e.g., a "draft" type). The system may include this determination in a label record corresponding to the modified label, such that machine learning model users or labelers may recognize that the data may not be in its full form. By doing so, the system ensures that labelers receive any contextual information regarding the accuracy and validity of training data, such that they may make informed decisions regarding whether to include a given datum within a machine learning model training routine, for example. This process enables more accurate machine learning model results and reduces the need for retraining models due to incomplete data.

In some embodiments, the system may determine a label update rate based on the label record and timestamps corresponding to the pre-existing label and the new label. That is, the system may determine, from the plurality of label records, a record timestamp for a label record corresponding to the pre-existing label. The system may determine, from the label modification request, a request timestamp for the new label. Based on comparing the record timestamp with the request timestamp, the system may determine a label update rate for the training datum. Based on determining that the label update rate is above a threshold update rate, the system may generate a warning for display on a user interface. For example, the system may calculate a label update rate based on how soon after the pre-existing label the new label was created. The system may generate a warning if this time period is too low (or, for example, if the update rate is too high). By doing so, the system may allow labelers to track labels that have been modified soon after an initial labeling decision and, thus, the system may enable prevention of labels that struggle to reach consensus. Thus, a labeler may focus on datasets that require more attention or thought in terms of labeling, in order to improve machine learning model performance.

In some embodiments, determining the request timestamp may include receiving a temporal identifier based on a standardized setting for recording times and recording the temporal identifier as the request timestamp. That is, the system may receive a temporal identifier for a point in time, wherein the temporal identifier includes a standardized setting for recording times across the computer network. The system may record the temporal identifier as the request timestamp. For example, the temporal identifier, such as a time stamp, used in determining the label update rate may be related to a standardized setting for recording time, such as a system time setting. By doing so, the system may ensure that even label modification requests applied by various entities or users on different devices are consistently logged, ensuring that label record updates are tracked accurately.

Figure 6:
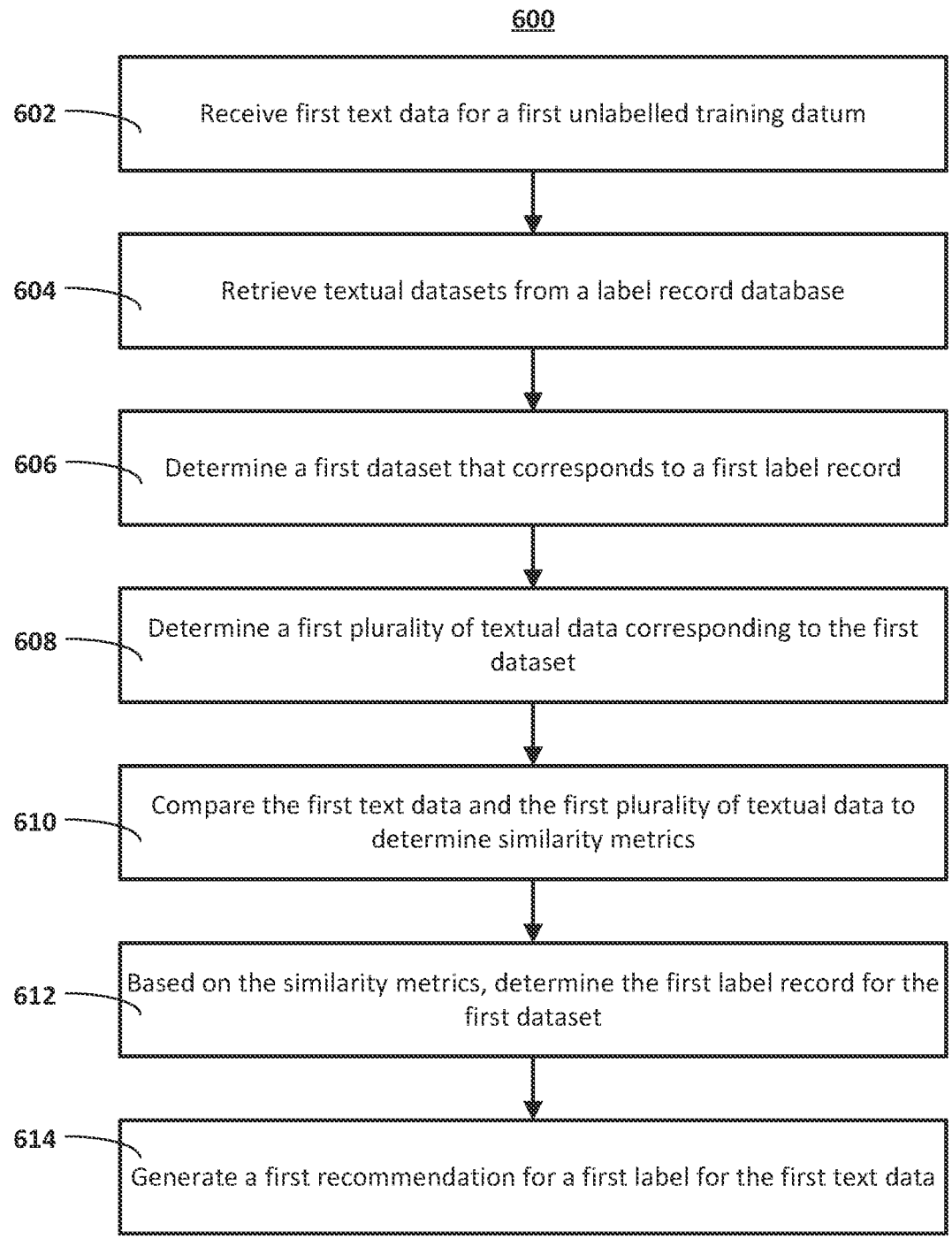
FIG. 6 shows a flowchart of the steps involved in generating recommendations for unlabeled chatbot data for use in an artificial neural network model using natural language processing, in accordance with one or more embodiments.

FIG. 6 shows a flowchart of the steps involved in generating labeling recommendations for unlabeled training data for a machine learning model. For example, the system may use process 600 (e.g., as implemented on one or more system components described above) in order to generate recommendations for labeling unlabeled chatbot textual data based on previously-labeled datasets within a label record database.

At operation 602, process 600 (e.g., using one or more components described above) may receive text data for an unlabeled training datum. That is, the system may receive, at a device on a computer network, first text data for a first unlabeled training datum in a first training dataset for a machine learning model. For example, the system may receive text data that has yet to be labeled (e.g., in the form of a chatbot conversation transcript) from another device connected to the network. The data may be used for training machine learning models and, as such, may require labeling or categorization before further processing. By receiving this data, the system may handle previously unlabeled data and process this data with further analysis. Thus, by receiving text data, the system may further determine, categorize, or process text for the data and other similar data that has previously been labeled, enabling the system to perform comparisons and, thus, determine a label without human interference.

At operation 604, process 600 (e.g., using one or more components described above) may retrieve textual datasets from a label record database. That is, the system may retrieve a plurality of textual datasets corresponding to a plurality of label records from a label record database. In some embodiments, the system may determine data that may be related to the unlabeled training datum (e.g., text data for an unlabeled text training datum) and, based on this determination, retrieve records that may be relevant to any labeling decisions for the unlabeled training datum. For example, the system (e.g., one or more of cloud components 310) may access the label record database and, in response, request access to the datasets associated with the label records within the database (e.g., the system may follow file paths or locations associated with the relevant dataset identifiers or datum identifiers corresponding to the datasets). By doing so, the system may perform analysis with more information than that within the label record database itself. Retrieving these datasets themselves, for example, enables the system to perform direct comparisons between datasets and the unlabeled training datum, which leads to improved labeling decision-making accuracy and efficiency.

In some embodiments, retrieving the plurality of textual datasets may involve extracting dataset identifiers and further retrieving data based on this. That is, the system may extract, from the plurality of label records, a plurality of dataset identifiers corresponding to each label record in the plurality of label records. Based on extracting the plurality of dataset identifiers, the system may retrieve a plurality of datasets corresponding to the plurality of dataset identifiers. Based on determining a subset of the plurality of datasets that includes text-based data, the system may generate the plurality of textual datasets. For example, the system may extract datasets based on the dataset identifier by filtering by the relevant field in the label record database and determine that the datasets contain alphanumeric strings of text before they are labeled "textual data." By doing so, the system may determine data that matches the type of the unlabeled training datum (e.g., text-based data), such that only data that may be comparable is considered. Thus, errors in labeling the data with the wrong label may be mitigated by retrieving datasets corresponding to previous labels and directly comparing these datasets with the unlabeled training datum.

At operation 606, process 600 (e.g., using one or more components described above) may determine a first dataset that corresponds to a first label record. That is, the system may determine a first dataset that corresponds to a first label record within the plurality of label records. For example, having determined textual data associated with the label record database, the system may determine a dataset of the textual datasets with which to compare the unlabeled training datum, for the purpose of analyzing label choice for the training datum. By doing so, the system may consider all previously-labeled data that may be relevant to the unlabeled training datum and, in response, may make further determinations based on these previously-labeled data. Thus, this operation enables more efficient labeling of unlabeled training data based on historical labeling data.

At operation 608, process 600 (e.g., using one or more components described above) may determine a first plurality of textual data corresponding to the first dataset. For example, the system may determine training data associated with the dataset identifier that is associated with the dataset. For example, the system may retrieve datum identifiers from a field within the label record database corresponding to the dataset in question (e.g., datum identifiers 130 within data structure 100, as shown in FIG. 1). For example, the system may follow links to data within a dataset using these datum identifiers (e.g., filenames). Thus, the system may prepare the datasets in a way that enables direct comparison between the training datum and the previously-labeled data within datasets, enabling further analysis to determine a label for the training datum based on these comparisons.

At operation 610, process 600 (e.g., using one or more components described above) may compare the first text data and the first plurality of textual data to determine similarity metrics. That is, the system may compare the first text data and the first plurality of textual data to determine a first plurality of similarity metrics between the first text data and respective textual data in the first plurality of textual data. For example, in some embodiments, the system may determine vector representations through natural language processing between the unlabeled training datum and each textual datum within the plurality of textual data. Based on these vector representations, the system may, for example, determine a similarity metric for each of these comparisons based on a similarity measure (e.g., a vector distance or cosine similarity values). By doing so, the system may determine which of the previously-labeled data may be similar to the unlabeled textual data and to what extent this is the case. Thus, the system may leverage these objective comparative metrics to determine a label for the data based solely on previous labeling decisions within the label record, enabling more efficient labeling without the need for human intervention, as well as labeling that is consistent with other datasets. Therefore, this comparative operation enables more accurate labeling and, thus, machine learning model training and performance.

In some embodiments, the system may compare the first text data with the first plurality of textual data by generating vector representations of the appropriate data and by inputting these representations within a natural language processing model. That is, the system may generate a vector representation of the first text data and a plurality of vector representations for the respective textual data in the first plurality of textual data for use in a natural language processing model. In response to inputting the vector representation and the plurality of vector representations into the natural language processing model, the system may determine the first plurality of similarity metrics between the first text data and the respective textual data in the first plurality of textual data. For example, the system may use a bag-of-words representation for textual chatbot data within the training datum, as well as for each datum in the first dataset. The system may then input the dataset into a natural language processing model, such as a named entity engine, in order to determine similarity metrics between the training datum and chatbot data within the first dataset. By doing so, the system may analytically determine measures of similarity between text data in question and any of the prior datasets labeled with a similar label and, as a result, the system may improve the efficiency and accuracy with which similarity is determined.

In some embodiments, the system may compare the first text data and the first plurality of textual data by retrieving data, generating vector representations for this data, and calculating inner products between the vector representations. That is, the system may retrieve, for each textual dataset in the plurality of textual datasets, a plurality of data. The system may generate a vector representation of the first text data and a plurality of vector representations for each datum in the first plurality of textual data for use in a natural language processing model. The system may calculate a plurality of inner products between the vector representation of the first text data and each vector representation of the plurality of vector representations. In response to calculating the plurality of inner products, the system may determine the first plurality of similarity metrics between the first text data and the respective textual data in the first plurality of textual data. For example, the system may directly compare vector representations, such as bags-of-words, in order to determine similarity metrics through a dot-product-like operation. By doing so, the system may simplify and streamline similarity metric calculations between datasets in order to improve the efficiency of labeling based on comparing the text data with the respective datasets.

In some embodiments, the system may compare the first text data and the first plurality of textual data by inputting the relevant data in a neural network model and generating text distances to determine similarity metrics. That is, based on inputting the first text data and the first plurality of textual data in a neural network model, the system may calculate a plurality of text distances between the first text data and the respective textual data in the first plurality of textual data. Based on the plurality of text distances, the system may calculate the first plurality of similarity metrics. For example, the system may calculate word distances based on distances in vector space produced from a natural language processing machine learning model (e.g., a neural network model). The similarity metric may, for example, be based on a normalized version of the inverse of these distances. By doing so, the system enables accurate calculations of distance between textual data, which assists the system in determining similarity metrics in an internally consistent way across all textual datasets.

At operation 612, process 600 (e.g., using one or more components described above) may, based on the similarity metrics, determine the first label record for the first dataset. That is, based on the first plurality of similarity metrics, the system may determine the first label record for the first dataset. For example, having determine the first plurality of similarity metrics, the system may further investigate or determine details regarding the dataset (e.g., if the dataset is shown to have enough similarity with the unlabeled training datum based on the similarity metrics). For example, the system may compare the first plurality of similarity metrics with a threshold similarity metric and, based on this comparison, determine that the unlabeled training datum is substantially similar to the data within the first dataset. In some embodiments, the system may compare the plurality of similarity metrics with another plurality of similarity metrics associated with another dataset associated with the label record database and, based on this comparison, determine that the first dataset's label record is more relevant to the unlabeled training datum. By looking up or determining the first label record for the first dataset, the system may determine a label associated with this dataset and, therefore, determine a label for the unlabeled training data based on the corresponding similarity, thereby enabling automated decision-making for labels based on these similarity metrics. Thus, the system may improve the efficiency and accuracy of labeling decisions based on comparing the unlabeled training data with previously-labeled data within datasets by leveraging similarity metrics.

At operation 614, process 600 (e.g., using one or more components described above) may generate a first recommendation for a first label for the first text data. That is, the system may generate a first recommendation for a first label for the first text data based on the first label record. For example, the system may generate a label name by retrieving a label name associated with the identified dataset that is similar to the unlabeled training datum (e.g., by looking up a label field in the label record database, such as within dataset labels 122 within data structure 100 in FIG. 1). In some embodiments, the system may generate the first recommendation for display on a screen or user interface, for further processing or confirmation by human labelers. By generating a label recommendation based on similarity to previously-labeled datasets through the use of similarity metrics, the system may determine a label for the unlabeled training datum based on historical labeling information stored within the label record database, enabling more efficient labeling decisions with little or no human input, while producing labeling decisions that may be consistent with past decisions. Thus, the system enables consistency in labeling of newly received data with other data used to train machine learning models, leading to improved machine learning model training accuracy, for example.

In some embodiments, the system may further determine a second dataset to which to make a comparison, and, based on this comparison, the system may generate a recommendation for a label based on the first dataset. That is, the system may determine a second dataset that corresponds to a second label record within the plurality of label records. The system may compare the first text data and a second plurality of textual data corresponding to the second dataset to determine a second plurality of similarity metrics between the first text data and the respective textual data in the second plurality of textual data. Based on the second plurality of similarity metrics, the system may generate the recommendation for the first label for the first text data based on the first label record. For example, the system may determine that another dataset may be a candidate for labeling the unlabeled training datum, but based on the second dataset's similarity metrics, the first label record is still more consistent with the unlabeled training datum. By doing so, the system may ensure that any recommendation for a label for the unlabeled training datum may be tested for similarity with other datasets, in order to ensure that no potential labeling decisions are missed. Thus, the system may look for datasets with higher similarity with the unlabeled training datum, enabling better labeling decisions.

In some embodiments, the system may determine a second dataset to which to make a comparison, and, based on this comparison, the system may generate a recommendation for a label based on the second dataset. That is, the system may determine a second dataset that corresponds to a second label record within the plurality of label records. The system may compare the first text data and a second plurality of textual data corresponding to the second dataset to determine a second plurality of similarity metrics between the first text data and the respective textual data in the second plurality of textual data. Based on the second plurality of similarity metrics, the system may generate the first recommendation for the first label for the first text data based on the second label record. For example, the system may instead determine that the second dataset may have similarity metrics that are more favorable than the first dataset and, as a result, label the text data based on the second label record corresponding dataset. By doing so, the system may ensure that, if a dataset is found that has a more favorable similarity with the unlabeled text data, that it is considered in the labeling decision. Thus, the system may improve selection of labels for the unlabeled text data and, as a result, provide more consistency and improved performance for the machine learning model.

In some embodiments, the system may determine a second dataset, generate a second plurality of similarity metrics, and compare the two pluralities of similarity metrics before making a recommendation. That is, the system may determine a second dataset that corresponds to a second label record within the plurality of label records. The system may compare the first text data and a second plurality of textual data corresponding to the second dataset to determine a second plurality of similarity metrics between the first text data and the respective textual data in the second plurality of textual data. Based on comparing the first plurality of similarity metrics and the second plurality of similarity metrics, the system may generate the first recommendation for the first label for the first text data. For example, the system may determine that another dataset may be a candidate for labeling the unlabeled training datum, but based on comparing similarity metrics between the training datum and the second dataset (e.g., through calculating average similarity metrics), the first label record is still more consistent. By doing so, the system may ensure that any recommendation for a label for the unlabeled training datum may be tested for similarity with other datasets, in order to ensure that no potential labeling decisions are missed. Thus, the system may look for datasets with higher similarity with the unlabeled training datum, enabling better labeling decisions.

In some embodiments, the system may compare the first and second pluralities of similarity metrics by determining respective average similarity metrics. That is, the system may determine that a first average of the first plurality of similarity metrics is higher than a second average of the second plurality of similarity metrics. For example, the system may calculate a mean (and, in some embodiments, a standard deviation) of each plurality of similarity metrics being considered and, based on this calculation, make a determination as to whether a dataset is substantially similar to the unlabeled training dataset. By doing so, the system may holistically consider the data within a dataset and whether it is relevant or similar to the unlabeled data, enabling more accurate labeling decisions that are consistent with other data that may be labeled similarly.

In some embodiments, the system may receive further text data that is associated with the unlabeled training datum and update similarity metrics accordingly before making a decision for another label for the unlabeled datum. That is, the system may receive second text data for the first unlabeled training datum, wherein the second text data includes real-time processed data. The system may compare the updated text data and the plurality of textual datasets to determine a second plurality of similarity metrics between the updated text data and the respective textual data in the plurality of textual datasets. Based on the second plurality of similarity metrics, the system may generate a second recommendation for a second label for the first unlabeled training datum. For example, the system may receive data that it receives after the first text data for the unlabeled training datum, such as through a dynamic stream of information from a chatbot. Based on this information, the system may update calculated similarity metrics and determine a new recommendation for a label for the training datum. By doing so, the system is robust to dynamic receipt of data, such that it may adapt to incoming data streams. Thus, the system may improve labeling in real time, which may ensure that any labels that are used for machine learning models are updated.

In some embodiments, the system may generate inputs based on the first label for a machine learning model and generate respective outputs. That is, the system may generate a first feature input for the machine learning model based on the first label and the first unlabeled training datum and may generate a first output for the machine learning model based on the first label and the first unlabeled training datum. For example, the system may use the new label within a machine learning model (e.g., a label for chatbot data related to a query type) in order to generate or train predictions or outputs (e.g., whether the query was answered properly). By doing so, the system may test any label that was applied to the training data within the application, enabling further diagnostics, evaluations or analyses of the output, such that labeling decisions may be further improved.

In some embodiments, the system may determine model error indicators and compare these for relevant records and/or datasets within the label record database. That is, based on the first output, the system may determine a first model error indicator. The system may determine a second model error indicator that corresponds to a second label record within the plurality of label records. The system may compare the first model error indicator and the second model error indicator. Based on comparing the first model error indicator and the second model error indicator, the system may generate the first recommendation for the first label for the first text data based on the second label record. For example, the system may determine a model error indicator for the output of the machine learning model (e.g., by comparing to a reference or training dataset), and may determine that a second model error is lower, for example: in response to this, the system may generate a recommendation for a label based on the label record associated with the second model error. By doing so, the system may learn from model performance of a given labeling decision and leverage this information to improve recommendations for labeling, in order to improve subsequent model performance.

In some embodiments, the system may generate a new label record in the label record database based on the labeling recommendation. That is, based on the first label from the first recommendation, the system may generate a new label record in the label record database, wherein the new label record includes the first label and an identifier of the first text data. For example, the system may append the new label record based on the first label from the first recommendation to a label record database, such that the labeling decision may be stored for future reference. By doing so, the system ensures that any future labeling decisions may be made with contextual information of the training data that has already been received and labeled. Thus, the system may reduce the chance of error or inconsistencies in future labeling decisions.

In some embodiments, the system may detect a new label record within the label record database and, based on this detection, evaluate the unlabeled training datum for whether a new recommendation may be made. That is, the system may detect a new label record in the label record database, wherein the new label record includes a new dataset identifier to a new dataset and a new label. The system may determine a new plurality of textual data corresponding to the new dataset. The system may compare the first text data and the new plurality of textual data to determine a new plurality of similarity metrics between the first text data and the respective textual data in the new plurality of textual data. Based on the new plurality of similarity metrics, the system may generate a second recommendation for a second label for the first text data based on the new label record. For example, the system may detect the creation of a new label record for another dataset (e.g., through sending commands to read the latest entries in the database). In response to calculating a new set of similarity metrics, the system may determine whether the dataset should be relabeled with a second label. By doing so, the system may adapt to new information regarding other datasets that may be received or labeled, in order to improve pre-existing labels and ensure consistency. Thus, model drift due to drifts in labeling rules or consistency may be avoided over time as new datasets are labeled and recorded in the label record database.

Figure 7:
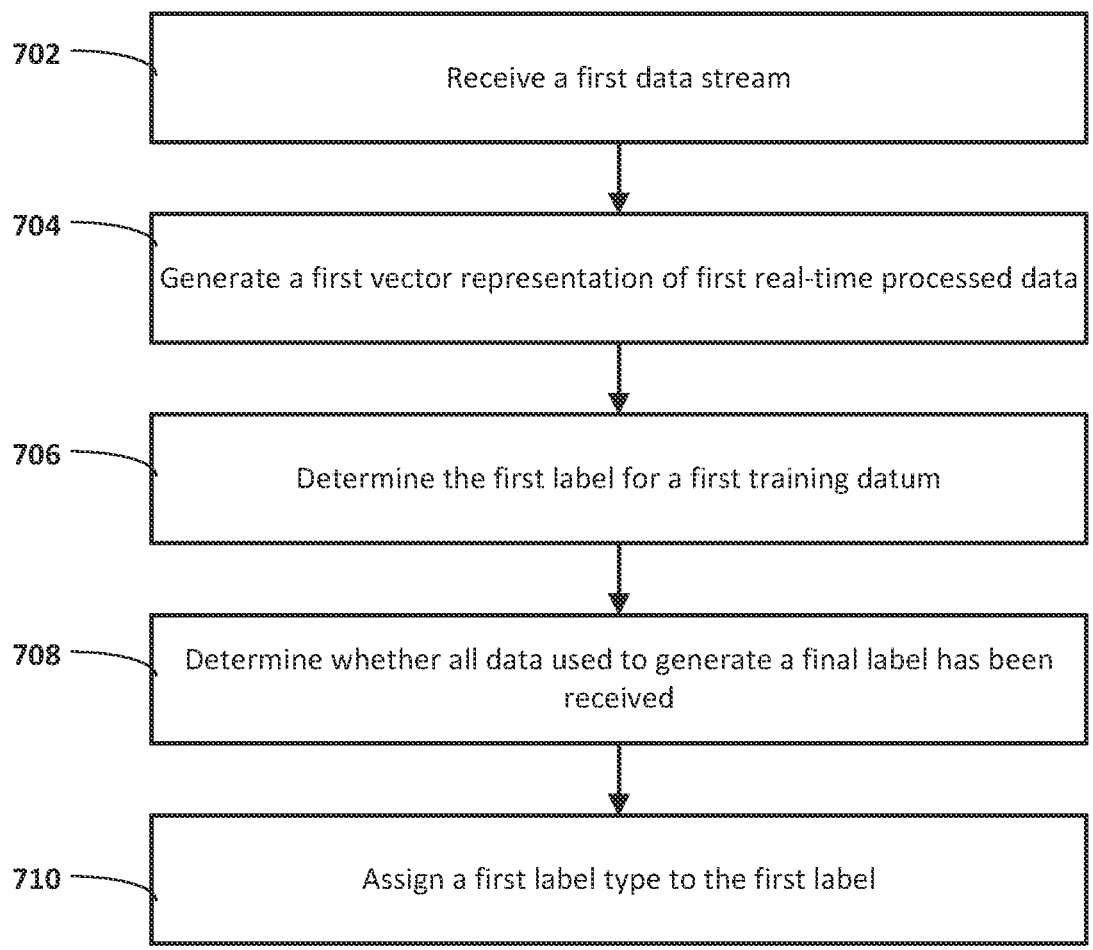
FIG. 7 shows a flowchart of the steps involved in generating labeling data for artificial neural network models for real-time data and batch-processed data streams, in accordance with one or more embodiments.

FIG. 7 shows a flowchart of the steps involved in generating labeling data for machine learning models for real-time data and batch-processed data to be used for training, in accordance with one or more embodiments. For example, the system may use process 700 (e.g., as implemented on one or more system components described above) in order to generate recommendations for labeling received chatbot data in both a real-time processed format, as well as a batch-processed format, for training an artificial neural network model, by assigning and recording label types for the received data.

At step 702, process 700 (e.g., using one or more components described above) may receive a first data stream. That is, the system may receive, at a device in a computer network, a first data stream, wherein the first data stream includes first real-time processed data for populating a first label for a first training datum in a first training dataset for a machine learning model. For example, the system may receive chatbot data that is being generated in real-time (e.g., during a conversation with a user). By doing so, the system may handle labeling tasks as they arise rather than waiting until the end of a conversation or a data stream. Thus, the system may make data processing more efficient for real-time processed data when compared to a conventional system for labeling.

At step 704, process 700 (e.g., using one or more components described above) may generate a first vector representation of the first real-time processed data. That is, the system may generate a first vector representation of the first real-time processed data for use in a natural language processing model. For example, the system may generate a bag-of-words vector representation of textual data (e.g., chatbot data) or, in some embodiments, the system may leverage a word2vec representation that may preserve semantic, lexical and syntactic information within the real-time processed data. By doing so, the system may take advantage of text processing techniques in order to efficiently process textual data that is received, leading to improved efficiency and accuracy in labeling decisions, while avoiding human error, bias and inconsistency.

At step 706, process 700 (e.g., using one or more components described above) may determine the first label for a first training datum. That is, the system may, based on processing the vector representation through the natural language processing model, determine the first label for the first training datum. For example, the system may process textual data (e.g., a text string) associated with individual chatbot interactions or responses and determine a vector representation based on this textual data, such as through a bag-of-words representation or a word2vec representation. By doing so, the system may pre-process the real-time data in a more easily analyzable form for determining a suitable label. Thus, processing the data and generating a vector representation enables the system to more efficiently allocate labels to real-time processed data in a way that is fast enough for dynamically-received data, where human labelers may struggle to keep up with the data's arrival.

In some embodiments, the system may determine the first label by inputting vector representations of data recorded in a label record database. That is, the system may retrieve a plurality of textual datasets and a corresponding plurality of label records from a label record database, wherein the corresponding plurality of label records includes a corresponding plurality of labels. The system may generate a plurality of vector representations corresponding to the plurality of textual datasets for use in the natural language processing model. In response to inputting the first vector representation, the plurality of vector representations, and the corresponding plurality of labels into the natural language processing model, the system may determine the first label for the first training datum. For example, the system may need to determine which textual datasets correspond to the label records by following file addresses or references to the dataset locations, before processing these datasets through the natural language processing model. By doing so, the system may ensure that any datasets that are used for generating labels are located and are directly associated with corresponding labels, such that datasets may be incorporated into the natural language processing model themselves and, thus, more accurate labeling decisions may be made.

At step 708, process 700 (e.g., using one or more components described above) may determine whether all data used to generate a final label has been received. That is, the system may determine whether all data used to generate a final label for the first training datum has been received. For example, the system may determine, based on a signal or message, that the real-time processed data (e.g., a chatbot interaction) has terminated or not and, as a result, whether all data needed to generate a final label has been received or not. By doing so, the system enables flagging and marking of any data that may be incomplete or not fully processed, thereby providing context to labelers regarding the accuracy or reliability of received data and associated labels. Thus, the system may continue to process and label datasets that have not been fully received, leading to boosts in efficiency, while still documenting any preliminary data received and processed by the system. Thus, the system enables labeling decisions and machine learning model evaluations to be made with more context regarding any input data used to train the model, for example, leading to improved model performance.

In some embodiments, the system may determine that all data used to generate a final label has been received based on a completion message. That is, the system may receive a completion message, wherein the completion message indicates an end of receiving data for the first training datum. For example, the system may determine whether all data has been received by receiving a completion message along with the data stream, such as a "Goodbye" message or a code marking completion of the data stream. By doing so, the system may determine when the end of a data stream occurs and, as a result, may determine the type of any labeling decisions. Thus, the system may better ensure that data that is incomplete may be marked as a draft and, therefore, that any subsequent model performance information should be treated accordingly.

In some embodiments, the system may determine that all data used to generate a final label has been received based on a lack of data receipt over a threshold elapsed time. That is, the system may determine that no data has been received for the threshold elapsed time. In response to determining that no data has been received for the threshold elapsed time, the system may determine that all data used to generate the final label has been received. For example, the system may wait a pre-determined period of time before determining that all data for generating a final label has been received, because no further data has been received during this period of time. For example, the system may wait for 24 hours before determining the final label. By doing so, the system may ensure that any data streams that have evidently stopped sending data are marked as final, even if no other indicators have been received. Thus, the system may mitigate against inaccurate pending labeling decisions.

At step 710, process 700 (e.g., using one or more components described above) may assign a first label type to the first label. That is, in response to determining that not all data used to generate the final label for the first training datum has been received, the system may assign a first label type to the first label. For example, as the received data may be determined to be preliminary in nature, the system may attach a label type that signals that the data is of a "Preliminary" or "Draft" type. In some embodiments, the system may append such a label designation or label type to a label record corresponding to the training datum, thereby recording the label type for the benefit of other labeling decisions. By doing so, the system enables any preliminary data to be processed and labeled even if unfinished. In marking the data as of a first type (e.g., a "Draft"), the system may still flag data as preliminary, such that any decisions or machine learning model training that is carried out with this preliminary data may be evaluated as such. Thus, the system provides context to labelers for labeling decisions, as well as to model evaluators, regarding the origin and reliability of training data. Thus, this labeling enables improvements in efficiency for processing and categorizing training data for machine learning models, without sacrificing on reliability or accuracy.

In some embodiments, the system may store the first label and label type in a label record database. That is, the system may store the first label in a label record database for the first training datum. The system may store a first indication that the first training datum has the first label type in the label record database. For example, the system may generate a label record including the first training datum, where the label record contains a label type. The first label type may be, for example. "Draft." The label record may then be appended to the label record database. By doing so, the system may store metadata information regarding the label in the database for future lookup or reference, thereby providing context for the data. Thus, any processing of the data through a machine learning model and subsequent evaluation of model performance may be contextualized depending on whether the respective input data was final or not, leading to more transparency, accountability, and accuracy in the machine learning model training process.

In some embodiments, the system may use this labeling information to generate feature inputs for the machine learning model and associated outputs. That is, the system may generate a first feature input for the machine learning model based on the first label, the first training datum, and the first indication. The system may generate a first output for the machine learning model based on the first label, the first training datum, and the first indication. For example, the system may use the initial draft of a label for real-time machine learning outputs. The system may also use the current label type (e.g., draft) to indicate that any output may be less reliable. By doing so, the system may process inputs through machine learning models in real-time, even in the absence of complete data, while providing context for the data (e.g., that the data may not be reliable due to its "draft" status). Thus, any analysis or evaluation of models with respect to labeling may be supplemented and adapted depending on this label type, which enables improved labeling decisions to be made subsequently.

In some embodiments, the system may receive a second data stream with batch-processed data and generate a final label based on this second data stream. That is, the system may receive a second data stream, wherein the second data stream includes batch-processed data for populating the first label. The system may generate a second vector representation of the batch-processed data for use in the natural language processing model. Based on processing the second vector representation through the natural language processing model, the system may determine a second label for the first training datum. The system may generate the final label for the first training datum based on the first label and the second label. For example, the system may subsequently receive information that has been processed as a whole (e.g., a full-text transcript of a conversation rather than dynamically-received chatbot messages) and, in response, determine a label for the training data by creating a vector representation of this batch data. The system may then determine a final label based on both the first label and the second label, for example, by merging the labels if they are similar or determining which label fits the data better through similarity metrics with other datasets. By doing so, the system may ensure that any additional data may be received and processed, enabling adapting to further data. Thus, the label record may be updated to reflect the latest information and, as such, any further calculations through machine learning models may be more accurate.

In some embodiments, generating the final label based on the first and second labels may include determining a label similarity metric. That is, in response to comparing the first label and the second label, the system may generate a label similarity metric. Based on determining that the label similarity metric is below a label similarity threshold, the system may generate a warning, for display on a user interface, that the first training datum has changed in nature. For example, in determining the second label, the system may determine its similarity with a first label by calculating a similarity metric through a natural language processing model (e.g., through calculation of a text distance between the two labels). If the labels are substantially different, the system may generate a warning to a user, such as a labeler, that the second data stream's label is different from the first. By doing so, the system may alert users to situations where the nature of data has changed over time, such that the first "draft"-type label does not apply anymore. Thus, labelers may evaluate whether, for example, the two data streams are compatible or whether they need to be separated and may determine whether further analysis is necessary before the data is prepared for machine learning model processing. As such, the system may prevent computation in the event that the label is not ready for processing if there is a large discrepancy, leading to improved error mitigation.

In some embodiments, the system may determine an update rate and generate a warning based on this update rate. That is, in response to determining that the first label and the final label are non-identical, the system may determine a first modification timestamp corresponding to receipt of the first data stream and a second modification timestamp corresponding to receipt of the second data stream. Based on the first modification timestamp and the second modification timestamp, the system may determine an update rate. Based on determining that the update rate is above a threshold update rate, the system may generate a warning, for display on a user interface, that label modification has occurred within a short period of time. For example, having compared the first label and the final label, the system may determine that they are not identical and determine when each label was created (e.g., by checking a system clock setting for the receipt of each data stream). Thus, the system may determine how quickly the update was made and, if the label modification occurred very quickly, generate a warning. By doing so, the system may ensure that users may track whether a label changes very quickly upon receipt of new information. Thus, the system may provide contextual information regarding whether a label may be trustworthy, depending on whether it is contested or changed very quickly. As a result, labelers may make better labeling decisions and evaluation decisions of model performance with respect to the data.

In some embodiments, the system may receive a second data stream and process this data together with the first data stream in order to determine a final label. That is, the system may receive a second data stream, wherein the second data stream includes batch-processed data for populating the final label. The system may generate a second vector representation of the batch-processed data for use in the natural language processing model. The system may combine the first vector representation and the second vector representation to generate a combined vector representation. Based on processing the combined vector representation through the natural language processing model, the system may determine the final label for the first training datum. For example, the system may vectorize both the first data stream and the second data stream (e.g., through a bag-of-words algorithm), concatenate the vectors, and process both through a natural language processing model. By doing so, rather than creating labels separately based on each data stream, the system may combine data streams, enabling processing of the entirety of the received data. Thus, the final label determined for the first training datum may be more accurate than processing each stream individually, leading to improved model performance when input into or when training a machine learning model.

In some embodiments, the system may determine, based on a second data stream, that all data used to generate the final label has been received. In response, the system may assign a final label to the training datum. That is, the system may receive a second data stream, wherein the second data stream includes batch-processed data for populating the first label. In response to receiving the second data stream, the system may determine that all the data used to generate the final label for the first training datum has been received. The system may generate the final label and, in response to determining that all the data used to generate the final label for the first training datum has been received, the system may assign a second label type to the final label. For example, the system may determine that the second data stream contains all the information for the first training datum; for example, the second data stream may contain a word such as "Goodbye" that indicates to the system that all data has been received. In response to this determination, the system may generate the final label and assign a second label type to this label (e.g., a "final" label type). By doing so, the system may indicate in the label record for the first training datum that all data required for this datum has been received, enabling machine learning processing and further analysis. Thus, the system may mark these machine learning model results as more reliable and, thus, may use this information to improve labeling decisions that are made for further data receipt.

In some embodiments, the system may store the label and an indication of the label type within a label record database. That is, the system may store, for the first training datum, the final label in a label record database. The system may store a second indication that the first training datum has the second label type in the label record database. For example, the system may, in response to determining that the final label has been received, store this label record in the label record database, including a field that includes the second label type (e.g., as datum label types 132 within data structure 100, as shown in FIG. 1). By doing so, the system may provide information regarding the finality of the data receipt and, as such, provide context in interpretation of machine learning model results associated with this training datum. For example, model output for a training datum for which all data has already been received and has been given a "final" data type may be considered more reliable than model output for a training datum of the first label type, ensuring improved interpretation of machine learning results.

In some embodiments, the system may generate a second feature input and associated output from the final label, training datum, and the second indication of label type. That is, the system may generate a second feature input for the machine learning model based on the final label, the first training datum, and the second indication. The system may generate a second output for the machine learning model based on the final label, the first training datum, and the second indication. For example, the system may use the final draft of a label to indicate that machine learning outputs have considered all the required data. The system may also use the current label type (e.g., "final") to indicate that any output may be more reliable than unfinished or "draft"-type data. By doing so, the system ensures that any data that is not finalized is differentiated from finalized data upon model processing. For example, the system may selectively process training data that have been labeled "final" rather than "draft" in order to improve machine learning model performance. Thus, the system may finalize this data, and model performance evaluation may be carried out with this knowledge, improving model improvement capabilities.

In some embodiments, the system may generate a model error indicator based on processing the training data through a machine learning model and assign a label type based on the model error indicator. That is, the system may generate a first feature input for the machine learning model based on the first label and the first training datum. The system may generate a first output for the machine learning model. The system may calculate a model error indicator based on the first output. Based on determining that the model error indicator is higher than a model error indicator threshold, the system may assign the first label type to the first label. For example, the system may compare a model error based on comparing a prediction from the output of a model with a real outcome and determine a statistical measure of this error based on this comparison. If the model error is too high, the model may assign a "draft" label to the label. By doing so, the system may flag any labeling that may cause unsatisfactory model errors. In response, labelers may review these datasets and determine more labels that improve model performance, before adding the labeling decision to the label record database and further processing data from the model. Thus, more accurate labeling decisions and model evaluations may be made.

It is contemplated that the steps or descriptions of FIGS. 4, 5, 6 and 7 may be used with any other embodiment of this disclosure. In addition, the steps and descriptions described in relation to FIGS. 4, 5, 6 and 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIGS. 4, 5, 6 and 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques for documenting label versions for artificial neural network input datasets from chatbot data will be better understood with reference to the following enumerated embodiments:

A1. A method, the method comprising: receiving, at a first time from a first device on a computer network, a label modification request for a dataset, wherein the label modification request comprises (1) a dataset identifier, (2) a model error indicator, (3) a user identifier, and (4) a new label, wherein the dataset identifier comprises a unique pointer to the dataset, wherein the model error indicator comprises an identifier of an artificial neural network and an indication of model performance of the artificial neural network when processing the dataset, wherein the user identifier comprises a name for a requester of label modification, and wherein the new label comprises a dataset name; receiving a temporal identifier for the first time and recording the temporal identifier as a modification timestamp, wherein the temporal identifier is standardized across the computer network; generating a label record and adding the label record to a label record database, wherein the label record is columnar and comprises the label modification request and the modification timestamp; in response to receiving, from a second device with a user interface on the computer network, a label history request including the dataset identifier, locating, in the label record database, a plurality of label records corresponding to the dataset identifier; and based on retrieving the plurality of label records from the label record database, generating, for display on the user interface, a summary of label records corresponding to the dataset identifier.

A2. A method, the method comprising: receiving, at a device on a computer network, a label modification request for a dataset; in response to the label modification request, determining a dataset identifier and a model error indicator; based on receiving the label modification request for the dataset, determining a modification timestamp; generating a label record, wherein the label record comprises the dataset identifier, the model error indicator, and the modification timestamp; and generating the label record in a label record database, wherein the label record database comprises a plurality of label records.

A3. The method of any one of the preceding embodiments, further comprising: receiving a first user request, wherein the first user request comprises a request for a label history corresponding to the dataset identifier; in response to receiving the first user request, retrieving, from the label record database, a list of label records corresponding to the dataset identifier; and generating, for display on a user interface, the list of label records corresponding to the dataset identifier.

A4. The method of any one of the preceding embodiments, further comprising: receiving a second user request, wherein the second user request comprises a request for a suggestion for a new label name; in response to receiving the second user request, retrieving, from the label record database, a list of label records corresponding to the dataset identifier; extracting a plurality of model error indicators, wherein each model error indicator in the plurality of model error indicators corresponds to each label record of the list of label records; and based on determining a lowest model error indicator of the plurality of model error indicators, generate, for display on a user interface, a recommendation for the new label name.

A5. The method of any one of the preceding embodiments, further comprising: determining a user identifier in response to the label modification request; populating the label record with the user identifier; receiving a third user request, wherein the third user request comprises the user identifier corresponding to modification of the dataset; in response to receiving the third user request, retrieving, from the label record database, a list of label records corresponding to the user identifier;

and generating, for display on a user interface, the list of label records corresponding to the user identifier.

A6. The method of any one of the preceding embodiments, wherein generating the label record comprises: determining a first field corresponding to dataset identifiers for the label record; and populating the first field with the dataset identifier.

A7. The method of any one of the preceding embodiments, wherein determining the dataset identifier comprises: determining, for the dataset associated with the label modification request, a dataset address and a last version creation time; and based on determining the dataset address and the last version creation time, generating the dataset identifier such that the dataset identifier uniquely identifies a combination of the dataset address and the last version creation time.

A8. The method of any one of the preceding embodiments, wherein determining the model error indicator comprises: locating the dataset associated with the label modification request; inputting the dataset into a machine learning model; generating an output dataset from the machine learning model; and based on comparing the output dataset with a training dataset, generating a statistical measure of error as the model error indicator.

A9. The method of any one of the preceding embodiments, wherein determining the modification timestamp comprises: receiving a temporal identifier for a point in time, wherein the temporal identifier comprises a standardized setting for recording times across the computer network; and recording the temporal identifier as the modification timestamp.

A10. The method of any one of the preceding embodiments, wherein the point in time is associated with a time at which the dataset associated with the label modification request was input into a machine learning model.

A11. The method of any one of the preceding embodiments, further comprising: determining an average update rate corresponding to a list of label records associated with the dataset identifier; and based on determining that the average update rate is above a threshold update rate, generating, for display on a user interface, a recommendation for a new label name, wherein the new label name corresponds to a recommended label record from the list of label records, and wherein the recommended label record comprises a lowest model error indicator within the list of label records.

A12. The method of any one of the preceding embodiments, further comprising: comparing the model error indicator with a threshold model error; and based on determining that the model error indicator is higher than the threshold model error, generating a warning for display on a user interface that the label modification request is invalid.

A13. The method of any one of the preceding embodiments, further comprising: determining whether all data used to generate a final label for the dataset has been received; and in response to determining that not all data used to generate the final label for the dataset has been received, assigning a first label type to a label in the label record corresponding to the dataset.

A14. The method of any one of the preceding embodiments, wherein receiving the label modification request for the dataset comprises: retrieving a plurality of reference datasets corresponding to a plurality of dataset identifiers in the label record database; and based on comparing the plurality of reference datasets with the dataset, determining a label for the dataset.

A15. The method of any one of the preceding embodiments, wherein determining the label for the dataset comprises: determining a plurality of similarity metrics between the dataset and each reference dataset in the plurality of reference datasets within the label record database; and based on determining that a first reference dataset of the plurality of reference datasets has a highest similarity metric of the plurality of similarity metrics, determining the label for the dataset.

A16. A tangible, non-transitory, machine-readable medium storing instructions that, when executed by a data processing apparatus, cause the data processing apparatus to perform operations comprising those of any of embodiments A1-A15.

A17. A system comprising one or more processors; and memory storing instructions that, when executed by the processors, cause the processors to effectuate operations comprising those of any of embodiments A1-A15.

A18. A system comprising means for performing any of embodiments A1-A15.

The present techniques for selecting labels based on dataset similarity for machine learning model training chatbot text data will be better understood with reference to the following enumerated embodiments:

B1. A method, the method comprising: receiving, at a device on a computer network, a label modification request for a training datum for a machine learning model, wherein the label modification request comprises a new label and a datum identifier, and wherein the new label comprises a category of chatbot data; retrieving, from a label record database, a plurality of label records corresponding to the datum identifier, wherein the plurality of label records comprises a plurality of pre-existing labels previously applied to the training datum; comparing a pre-existing label from the plurality of pre-existing labels with the new label; based on determining that the pre-existing label from the plurality of pre-existing labels differs from the new label, generating, based on the label record database, (1) a first dataset labeled with the new label and (2) a second dataset labeled with the pre-existing label; calculating a first plurality of similarity metrics between the training datum and each datum of the first dataset and a second plurality of similarity metrics between the training datum and each datum of the second dataset; calculating a first average similarity metric based on an average of the first plurality of similarity metrics and a second average similarity metric based on an average of the second plurality of similarity metrics; comparing the first average similarity metric with the second average similarity metric; and based on determining that the second average similarity metric is higher than the first average similarity metric, generating a recommendation for a modified label based on the pre-existing label.

B2. A method, the method comprising receiving, at a device on a computer network, a label modification request for a training datum for a machine learning model, wherein the label modification request comprises a new label and a datum identifier; retrieving, from a label record database, a plurality of label records corresponding to the datum identifier; comparing a pre-existing label from the plurality of label records with the new label; based on determining that the pre-existing label from the plurality of label records differs from the new label, generating, based on the label record database, (1) a first dataset labeled with the new label and (2) a second dataset labeled with the pre-existing label: calculating (1) a first average similarity metric between the training datum and the first dataset and (2) a second average similarity metric between the training datum and the second dataset; comparing the first average similarity metric with the second average similarity metric; and based on comparing the first average similarity metric with the second average similarity metric, generating a recommendation for a modified label.

B3. The method of any one of the preceding embodiments, wherein calculating the first average similarity metric and the second average similarity metric comprises: calculating a first plurality of similarity metrics between the training datum and each datum of the first dataset and a second plurality of similarity metrics between the training datum and each datum of the second dataset; and calculating the first average similarity metric based on an average of the first plurality of similarity metrics and the second average similarity metric based on an average of the second plurality of similarity metrics.

B4. The method of any one of the preceding embodiments, wherein calculating the first plurality of similarity metrics between the training datum and each datum of the first dataset comprises: generating, for use in a natural language processing model, a vector representation of the training datum and a plurality of vector representations corresponding to data in the first dataset; and in response to inputting the vector representation and the plurality of vector representations into the natural language processing model, generating the first plurality of similarity metrics.

B5. The method of any one of the preceding embodiments, further comprising: based on comparing the first average similarity metric and the second average similarity metric, determining that the first average similarity metric is higher than the second average similarity metric; and based on determining that the first average similarity metric is higher than the second average similarity metric, generating the recommendation for the modified label to include the new label.

B6. The method of any one of the preceding embodiments, further comprising: based on comparing the first average similarity metric and the second average similarity metric, determining that the second average similarity metric is higher than the first average similarity metric; and based on determining that the second average similarity metric is higher than the first average similarity metric, generating the recommendation for the modified label to include the pre-existing label.

B7. The method of any one of the preceding embodiments, further comprising: based on the recommendation for the modified label, determining a modified label record for the training datum, wherein the modified label record comprises a modified label name, an updated modification timestamp, and the datum identifier; and generating the modified label record in the label record database.

B8. The method of any one of the preceding embodiments, further comprising: generating a first feature input for the machine learning model based on the modified label and the training datum; and generating a first output for the machine learning model based on the modified label and the training datum.

B9. The method of any one of the preceding embodiments, further comprising: based on the first output, determining a model error indicator; and generating a modified label record in the label record database, wherein the modified label record comprises the model error indicator.

B10. The method of any one of the preceding embodiments, further comprising: detecting, in the label record database, an updated label record for a third dataset labeled with the pre-existing label; calculating a third average similarity metric between the training datum and the third dataset; based on comparing the third average similarity metric with the first average similarity metric and the second average similarity metric, determining an updated label for the training datum; and generating the recommendation for the modified label based on the updated label.

B11. The method of any one of the preceding embodiments, further comprising: detecting, in the label record database, an updated label record for a fourth dataset labeled with the new label; calculating a fourth average similarity metric between the training datum and the fourth dataset; based on comparing the fourth average similarity metric with the first average similarity metric and the second average similarity metric, determining an updated label for the training datum; and generating the recommendation for the modified label based on the updated label.

B12. The method of any one of the preceding embodiments, further comprising: determining whether all data used to generate the modified label for the training datum has been received; and in response to determining that not all data used to generate the modified label for the training datum has been received, assigning a first label type to the modified label.

B13. The method of any one of the preceding embodiments, further comprising: determining, from the plurality of label records, a record timestamp for a label record corresponding to the pre-existing label; determining, from the label modification request, a request timestamp for the new label; based on comparing the record timestamp with the request timestamp, determining a label update rate for the training datum; and based on determining that the label update rate is above a threshold update rate, generating a warning for display on a user interface.

B14. The method of any one of the preceding embodiments, wherein determining, from the label modification request, the request timestamp for the new label comprises: receiving a temporal identifier for a point in time, wherein the temporal identifier comprises a standardized setting for recording times across the computer network; and recording the temporal identifier as the request timestamp.

B15. The method of any one of the preceding embodiments, wherein generating, based on the label record database. (1) the first dataset labeled with the new label and (2) the second dataset labeled with the pre-existing label comprises: generating, from the label record database, a first plurality of label records associated with the new label and a second plurality of label records associated with the pre-existing label; generating a first plurality of modification timestamps corresponding to the first plurality of label records and a second plurality of modification timestamps corresponding to the second plurality of label records; based on the first plurality of modification timestamps and the second plurality of modification timestamps, determining a first label record for the new label and a second label record for the pre-existing label; and based on the first label record and the second label record, determining the first dataset labeled with the new label and the second dataset labeled with the pre-existing label.

B16. A tangible, non-transitory, machine-readable medium storing instructions that, when executed by a data processing apparatus, cause the data processing apparatus to perform operations comprising those of any of embodiments B1-B15.

B17. A system comprising one or more processors; and memory storing instructions that, when executed by the processors, cause the processors to effectuate operations comprising those of any of embodiments B1-B15.

B18. A system comprising means for performing any of embodiments B1-B15.

The present techniques for generating recommendations for unlabeled chatbot data for use in an artificial neural network model using natural language processing will be better understood with reference to the following enumerated embodiments:

C1. A method, the method comprising: receiving, at a device on a computer network, first text data for a first unlabeled training datum, corresponding to chatbot messages from a chatbot user, in a first training dataset for a machine learning model, wherein the first text data comprises language-based data with syntax information; retrieving a plurality of textual datasets corresponding to a plurality of label records from a label record database, wherein the plurality of label records comprises a plurality of dataset identifiers and corresponding labels, and wherein the plurality of textual datasets comprise chatbot text data previously processed through machine learning models: generating a vector representation of the first text data and a plurality of vector representations of the plurality of textual datasets for use in a natural language processing model, wherein the vector representation preserves syntax; in response to inputting the vector representation and the plurality of vector representations into a natural language processing-based neural network model, determining a plurality of average similarity metrics between the first text data and each textual dataset in the plurality of textual datasets; determining that a first dataset of the plurality of textual datasets has a highest average similarity metric of the plurality of average similarity metrics, wherein the plurality of average similarity metrics measures lexical and syntactic similarity between text; based on determining that the first dataset of the plurality of textual datasets has the highest average similarity metric of the plurality of average similarity metrics, determining a label record for the first dataset, wherein the label record comprises a label name, a modification timestamp, and a first dataset identifier; generating a first recommendation, for display on a user interface, for a first label for the first text data based on the label record for the first dataset; generating a first feature input for the machine learning model based on the first label and the first unlabeled training datum; and generating a first output for the machine learning model based on the first label and the first unlabeled training datum, wherein the first output comprises sentiment analysis relating to satisfaction of the chatbot user.

C2. A method, the method comprising: receiving, at a device on a computer network, first text data for a first unlabeled training datum in a first training dataset for a machine learning model; retrieving a plurality of textual datasets corresponding to a plurality of label records from a label record database; determining a first dataset that corresponds to a first label record within the plurality of label records; determining a first plurality of textual data corresponding to the first dataset; comparing the first text data and the first plurality of textual data to determine a first plurality of similarity metrics between the first text data and respective textual data in the first plurality of textual data; based on the first plurality of similarity metrics, determining the first label record for the first dataset; and generating a first recommendation for a first label for the first text data based on the first label record.

C3. The method of any one of the preceding embodiments, further comprising: determining a second dataset that corresponds to a second label record within the plurality of label records; comparing the first text data and a second plurality of textual data corresponding to the second dataset to determine a second plurality of similarity metrics between the first text data and the respective textual data in the second plurality of textual data: and based on the second plurality of similarity metrics, generating the first recommendation for the first label for the first text data based on the first label record.

C4. The method of any one of the preceding embodiments, further comprising: determining a second dataset that corresponds to a second label record within the plurality of label records; comparing the first text data and a second plurality of textual data corresponding to the second dataset to determine a second plurality of similarity metrics between the first text data and the respective textual data in the second plurality of textual data; and based on the second plurality of similarity metrics, generating the first recommendation for the first label for the first text data based on the second label record.

C5. The method of any one of the preceding embodiments, further comprising: determining a second dataset that corresponds to a second label record within the plurality of label records; comparing the first text data and a second plurality of textual data corresponding to the second dataset to determine a second plurality of similarity metrics between the first text data and the respective textual data in the second plurality of textual data; and based on comparing the first plurality of similarity metrics and the second plurality of similarity metrics, generating the first recommendation for the first label for the first text data.

C6. The method of any one of the preceding embodiments, wherein comparing the first plurality of similarity metrics and the second plurality of similarity metrics to determine the first label record for the first dataset further comprises determining that a first average of the first plurality of similarity metrics is higher than a second average of the second plurality of similarity metrics.

C7. The method of any one of the preceding embodiments, wherein retrieving the plurality of textual datasets corresponding to the plurality of label records from the label record database comprises: extracting, from the plurality of label records, a plurality of dataset identifiers corresponding to each label record in the plurality of label records; based on extracting the plurality of dataset identifiers, retrieving a plurality of datasets corresponding to the plurality of dataset identifiers; and based on determining a subset of the plurality of datasets that comprises text-based data, generating the plurality of textual datasets.

C8. The method of any one of the preceding embodiments, further comprising: receiving second text data for the first unlabeled training datum, wherein the second text data comprises real-time processed data; generating updated text data by appending the second text data to the first text data; comparing the updated text data and the plurality of textual datasets to determine a second plurality of similarity metrics between the updated text data and the respective textual data in the plurality of textual datasets; and based on the second plurality of similarity metrics, generating a second recommendation for a second label for the first unlabeled training datum.

C9. The method of any one of the preceding embodiments, wherein comparing the first text data and the first plurality of textual data to determine the first plurality of similarity metrics between the first text data and the respective textual data in the first plurality of textual data comprises: generating a vector representation of the first text data and a plurality of vector representations for the respective textual data in the first plurality of textual data for use in a natural language processing model; and in response to inputting the vector representation and the plurality of vector representations into the natural language processing model, determining the first plurality of similarity metrics between the first text data and the respective textual data in the first plurality of textual data.

C10. The method of any one of the preceding embodiments, wherein comparing the first text data and the first plurality of textual data to determine the first plurality of similarity metrics between the first text data and the respective textual data in the first plurality of textual data comprises: retrieving, for each textual dataset in the plurality of textual datasets, a plurality of data; generating a vector representation of the first text data and a plurality of vector representations for each datum in the first plurality of textual data for use in a natural language processing model; calculating a plurality of inner products between the vector representation of the first text data and each vector representation of the plurality of vector representations; and in response to calculating the plurality of inner products, determining the first plurality of similarity metrics between the first text data and the respective textual data in the first plurality of textual data.

C11. The method of any one of the preceding embodiments, wherein comparing the first text data and the first plurality of textual data to determine the first plurality of similarity metrics between the first text data and the respective textual data in the first plurality of textual data comprises: based on inputting the first text data and the first plurality of textual data in a neural network model, calculating a plurality of text distances between the first text data and the respective textual data in the first plurality of textual data; and based on the plurality of text distances, calculating the first plurality of similarity metrics.

C12. The method of any one of the preceding embodiments, further comprising: generating a first feature input for the machine learning model based on the first label and the first unlabeled training datum; and generating a first output for the machine learning model based on the first label and the first unlabeled training datum.

C13. The method of any one of the preceding embodiments, further comprising: based on the first output, determining a first model error indicator; determining a second model error indicator that corresponds to a second label record within the plurality of label records; comparing the first model error indicator and the second model error indicator; and based on comparing the first model error indicator and the second model error indicator, generating the first recommendation for the first label for the first text data based on the second label record.

C14. The method of any one of the preceding embodiments, further comprising: based on the first label from the first recommendation, generating a new label record in the label record database, wherein the new label record comprises the first label and an identifier of the first text data.

C15. The method of any one of the preceding embodiments, further comprising: detecting a new label record in the label record database, wherein the new label record comprises a new dataset identifier to a new dataset and a new label; determining a new plurality of textual data corresponding to the new dataset; comparing the first text data and the new plurality of textual data to determine a new plurality of similarity metrics between the first text data and the respective textual data in the new plurality of textual data; and based on the new plurality of similarity metrics, generating a second recommendation for a second label for the first text data based on the new label record.

C16. A tangible, non-transitory, machine-readable medium storing instructions that, when executed by a data processing apparatus, cause the data processing apparatus to perform operations comprising those of any of embodiments C1-C15.

C17. A system comprising one or more processors; and memory storing instructions that, when executed by the processors, cause the processors to effectuate operations comprising those of any of embodiments C1-C15.

C18. A system comprising means for performing any of embodiments C1-C15.

The present techniques for labeling data for artificial neural network models when information used to determine those labels may be received in both real-time data and batch-processed data streams will be better understood with reference to the following enumerated embodiments:

D1. A method, the method comprising: receiving, at a device in a computer network, a first data stream, wherein the first data stream comprises first real-time processed data for populating a first label for a first training datum in a first training dataset for an artificial neural network model, wherein the first real-time processed data comprises textual chatbot data from an artificial intelligence engine for a chatbot user; generating a first vector representation of the first real-time processed data for use in a natural language processing model, wherein the first vector representation represents the first real-time processed data using a bag-of-words structure; based on processing the first vector representation through the natural language processing model, determining the first label for the first training datum; in response to receiving a completion message, determining whether all data used to generate a final label for the first training datum has been received, wherein the completion message comprises an indication of an end of the first real-time processed data: in response to not receiving the completion message upon termination of the first data stream, assigning a first label type to the first label; storing, in a label record database for the first training datum, the first label and a first indication that the first label for the first training datum has the first label type; generating a first feature input for the artificial neural network model based on the first label, the first training datum, and the first indication; and generating a first output for the artificial neural network model based on the first label, the first training datum, and the first indication, wherein the first output comprises sentiment prediction for a satisfaction level for the chatbot user.

D2. A method, the method comprising: receiving, at a device in a computer network, a first data stream, wherein the first data stream comprises first real-time processed data for populating a first label for a first training datum in a first training dataset for a machine learning model; generating a first vector representation of the first real-time processed data for use in a natural language processing model; based on processing the first vector representation through the natural language processing model, determining the first label for the first training datum; determining whether all data used to generate a final label for the first training datum has been received; and in response to determining that not all data used to generate the final label for the first training datum has been received, assigning a first label type to the first label.

D3. The method of any one of the preceding embodiments, further comprising: storing the first label for the first training datum in a label record; and storing a first indication that the first training datum has the first label type in the label record database.

D4. The method of any one of the preceding embodiments, further comprising: generating a first feature input for the machine learning model based on the first label, the first training datum, and the first indication; and generating a first output for the machine learning model based on the first label, the first training datum, and the first indication.

D5. The method of any one of the preceding embodiments, the method further comprising: receiving a second data stream, wherein the second data stream comprises batch-processed data for populating the first label; generating a second vector representation of the batch-processed data for use in the natural language processing model; based on processing the second vector representation through the natural language processing model, determining a second label for the first training datum; and generating the final label for the first training datum based on the first label and the second label.

D6. The method of any one of the preceding embodiments, wherein generating the final label for the first training datum based on the first label and the second label comprises: in response to comparing the first label and the second label, generating a label similarity metric; and based on determining that the label similarity metric is below a label similarity threshold, generating a warning, for display on a user interface, that the first training datum has changed in nature.

D7. The method of any one of the preceding embodiments, further comprising: in response to determining that the first label and the final label are non-identical, determining a first modification timestamp corresponding to receipt of the first data stream and a second modification timestamp corresponding to receipt of the second data stream; based on the first modification timestamp and the second modification timestamp, determining an update rate; and based on determining that the update rate is above a threshold update rate, generating a warning, for display on a user interface, that label modification has occurred within a short period of time.

D8. The method of any one of the preceding embodiments, further comprising: receiving a second data stream, wherein the second data stream comprises batch-processed data for populating the first label: generating a second vector representation of the batch-processed data for use in the natural language processing model: combining the first vector representation and the second vector representation to generate a combined vector representation; and based on processing the combined vector representation through the natural language processing model, determining the final label for the first training datum.

D9. The method of any one of the preceding embodiments, further comprising: receiving a second data stream, wherein the second data stream comprises batch-processed data for populating the first label: in response to receiving the second data stream, determining that all the data used to generate the final label for the first training datum has been received; generating the final label; and in response to determining that all the data used to generate the final label for the first training datum has been received, assigning a second label type to the final label.

D10. The method of any one of the preceding embodiments, further comprising: storing, for the first training datum, the final label in a label record database: and storing a second indication that the first training datum has the second label type in the label record database.

D11. The method of any one of the preceding embodiments, further comprising: generating a second feature input for the machine learning model based on the final label, the first training datum, and the second indication; and generating a second output for the machine learning model based on the final label, the first training datum, and the second indication.

D12. The method of any one of the preceding embodiments, wherein determining whether all data used to generate the final label for the first training datum has been received comprises: receiving a completion message, wherein the completion message indicates an end of receiving data for the first training datum.

D13. The method of any one of the preceding embodiments, wherein determining whether all data used to generate the final label for the first training datum has been received comprises: determining that no data has been received for a threshold elapsed time; and based on determining that no data has been received for the threshold elapsed time, determining that all data used to generate the final label has been received.

D14. The method of any one of the preceding embodiments, wherein, based on processing the first vector representation through the natural language processing model, determining the first label for the first training datum comprises: retrieving a plurality of textual datasets and a corresponding plurality of label records from a label record database, wherein the corresponding plurality of label records comprises a corresponding plurality of labels; generating a plurality of vector representations corresponding to the plurality of textual datasets for use in the natural language processing model; and in response to inputting the first vector representation, the plurality of vector representations, and the corresponding plurality of labels into the natural language processing model, determining the first label for the first training datum.

D15. The method of any one of the preceding embodiments, further comprising: generating a first feature input for the machine learning model based on the first label and the first training datum; generating a first output for the machine learning model; calculating a model error indicator based on the first output; and based on determining that the model error indicator is higher than a model error indicator threshold, assigning the first label type to the first label.

D16. A tangible, non-transitory, machine-readable medium storing instructions that, when executed by a data processing apparatus, cause the data processing apparatus to perform operations comprising those of any of embodiments D1-D15.

D17. A system comprising one or more processors; and memory storing instructions that, when executed by the processors, cause the processors to effectuate operations comprising those of any of embodiments D1-D15.

D18. A system comprising means for performing any of embodiments D1-D15.

What is claimed is:

1. A system for labeling data for artificial neural network models using both real-time data and batch-processed data streams that reduces computations resulting from labeling discrepancies, the system comprising:
   one or more processors; and
   one or more non-transitory, computer-readable media comprising instructions that when executed by the one or more processors cause operations comprising:
      receiving, at a device in a computer network, a first data stream comprising real-time processed data for populating a label for a training datum in a training dataset for an artificial neural network model, wherein the real-time processed data comprises initial textual chatbot data from an artificial intelligence engine for a chatbot user;
      generating a first vector representation of the real-time processed data using a bag of words structure;
      determining, based on the first vector representation, using a natural language processing model, a first label for the training datum;
      assigning, based on a determination that the first data stream terminated prior to receipt of a completion message, a first label type to the label;
      storing, in a label record database, for the training datum, a record comprising the first label and the first label type, the record tracking labeling changes of the training datum;
      generating a first feature input based on the training datum, the first label, and the first label type and inputting the first feature input to the artificial neural network model to generate a first output comprising a first classification of the chatbot user based on the initial textual chatbot data;
      receiving a second data stream comprising batch-processed data for populating the label, the batch-processed data comprising completed textual chatbot data from the artificial intelligence engine for the chatbot user including the completion message;
      generating a second vector representation of the batch-processed data and determining, using the natural language processing model, a second label for the training datum based on the second vector representation;
      responsive to determining, based on a similarity metric computed using the first vector representation and the second vector representation being less than a label similarity threshold, that the second label differs from the first label:
         updating the record to comprise the first label with the first label type and the second label with a second label type assigned based on the completion message being received; and
         preventing a second feature input generated based on the training datum, the label, and the second label type from being input to the artificial neural network model.

2. A method comprising:
   receiving a first data stream comprising first real-time processed data for populating a label of a first training datum;
   generating a first vector representation of the first real-time processed data and inputting the first vector representation into a natural language processing model to determine a first label for the first training datum;
   generating, using an artificial neural network model, based on the first training datum including the first label and a first label type indicating that a completion message was absent from the first real-time processed data, a first output comprising a classification for the first data stream;
   receiving a second data stream comprising batch-processed data for populating the label of the first training datum;
   generating a second vector representation of the batch-processed data and inputting the second vector representation into the natural language processing model to determine a second label for the first training datum; and
   preventing the first training datum including the second label from being input to the artificial neural network model based on the second label differing from the first label.

3. The method of claim 2, further comprising:
   storing, in a label record database, a record comprising the first label and the first label type; and
   updating the record to comprise the first label with the first label type and the second label.

4. The method of claim 3, further comprising:
   generating a first feature input for the artificial neural network model based on the first label, the first training datum, and the first label type; and
   generating the first output for the artificial neural network model based on the first label, the first training datum, and the first label type.

5. The method of claim 4, further comprising:
   generating a second feature input for the artificial neural network model based on the second label, the first training datum, and a second label type for the second label assigned based on the completion message being included in the second data stream; and
   generating a second output for the artificial neural network model based on the second label, the first training datum, and the second label type.

6. The method of claim 2, further comprising:
based on the second data stream including the completion message:
  determining a second label type for the second label;
  generating a final label for the first training datum based on the first label and the second label; and
  updating a record stored in a label record database for the first training datum to include the first label with the first label type, the second label with the second label type, and the final label.

7. The method of claim 6, wherein generating the final label for the first training datum based on the first label and the second label comprises:
  generating a label similarity metric based on a comparison of the first label and the second label;
  determining that the label similarity metric is below a label similarity threshold;
  generating a warning, for display on a user interface, that the first training datum has changed in nature, wherein the first training datum is prevented from being input to the artificial neural network model based on the warning.

8. The method of claim 6, further comprising:
  determining that the first label and the final label are non-identical;
  determining a first modification timestamp corresponding to receipt of the first data stream and a second modification timestamp corresponding to receipt of the second data stream;
  based on the first modification timestamp and the second modification timestamp, determining an update rate;
  determining that the update rate is above a threshold update rate; and
  generating a warning, for display on a user interface, that label modification has occurred within a short period of time, wherein the first training datum is prevented from being input to the artificial neural network model based on the warning.

9. The method of claim 2, further comprising:
  combining the first vector representation and the second vector representation to generate a combined vector representation;
  processing the combined vector representation through the natural language processing model to determine a final label for the first training datum.

10. The method of claim 2, further comprising:
  determining that the second data stream includes the completion message indicating that all data used for generating a final label for the first training datum has been received;
  assigning a second label type to the second label based on the completion message being received; and
  generating the final label based on the first label and the second label.

11. The method of claim 10, further comprising:
  storing, for the first training datum, in a label record database, a record comprising the first label with the first label type, the second label with the second label type, and the final label with the second label type.

12. The method of claim 2, further comprising:
  determining that the second data stream includes the completion message, indicating an end of receiving data for the first training datum.

13. The method of claim 2, wherein further comprising:
  determining an amount of time that has elapsed since data was last received; and
  determining that the amount of time is greater than a threshold elapsed time, wherein the second label is determined based on the amount of time being greater than the threshold elapsed time.

14. The method of claim 2, wherein inputting the first vector representation into the natural language processing model to determine the first label for the first training datum comprises:
  retrieving a plurality of textual datasets and a corresponding plurality of label records from a label record database, wherein the corresponding plurality of label records comprises a corresponding plurality of labels;
  generating a plurality of vector representations corresponding to the plurality of textual datasets for use in the natural language processing model; and
  inputting the first vector representation, the plurality of vector representations, and the corresponding plurality of labels into the natural language processing model to determine the first label for the first training datum.

15. The method of claim 2, further comprising:
  generating a first feature input for the artificial neural network model based on the first label and the first training datum;
  generating the first output for the artificial neural network model;
  calculating a model error indicator based on the first output;
  determining that the model error indicator is greater than a model error indicator threshold; and
  assigning the first label type to the first label based on the model error indicator being greater than the model error indicator threshold.

16. One or more non-transitory, computer-readable media comprising instructions that, when executed by one or more processors, cause the one or more processors to perform operations comprising:
  receiving a first data stream comprising first real-time processed data for populating a label of a first training datum;
  generating a first vector representation of the first real-time processed data and inputting the first vector representation into a natural language processing model a first label for the first training datum;
  generating, using an artificial intelligence model, based on the first training datum including the first label and a first label type assigned to the first label indicating that the first label was generated prior to receipt of a completion message, a first output comprising a classification for the first data stream;
  receiving a second data stream comprising batch-processed data for populating the label;
  generating a second vector representation of the batch-processed data and inputting the second vector representation into the natural language processing model to determine a second label for the first training datum; and
  preventing the first training datum including the second label from being input to the artificial intelligence model based on the second label differing from the first label.

17. The one or more non-transitory, computer-readable media of claim 16, wherein the operations further comprise:
  storing a record in a label record database.

18. The one or more non-transitory, computer-readable media of claim 17, wherein the operations further comprise:

generating a first feature input for a machine learning model based on the first label, the first training datum, and the first label type; and generating the first output for the machine learning model based on the first label, the first training datum, and the first label type.

19. The one or more non-transitory, computer-readable media of claim 16, wherein the operations further comprise:
generating a final label for the first training datum based on the first label and the second label.

20. The one or more non-transitory, computer-readable media of claim 16, wherein the operations further comprise:
generating the first feature input for a machine learning model based on the first label and the first training datum;
generating a first output for the machine learning model;
calculating a model error indicator based on the first output; and
responsive to determining that the model error indicator is greater than a model error indicator threshold, assigning the first label type to the first label.

\* \* \* \* \*